United States Patent
Toyotaka et al.

(10) Patent No.: US 9,214,121 B2
(45) Date of Patent: Dec. 15, 2015

(54) DRIVING METHOD OF LIQUID CRYSTAL DISPLAY DEVICE

(75) Inventors: Kouhei Toyotaka, Atsugi (JP); Koji Kusunoki, Kawasaki (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1200 days.

(21) Appl. No.: 13/005,571

(22) Filed: Jan. 13, 2011

(65) Prior Publication Data

US 2011/0175883 A1 Jul. 21, 2011

(30) Foreign Application Priority Data

Jan. 20, 2010 (JP) ................................. 2010-009853

(51) Int. Cl.
G09G 3/36 (2006.01)

(52) U.S. Cl.
CPC ........ G09G 3/3648 (2013.01); *G09G 2330/027* (2013.01)

(58) Field of Classification Search
CPC ..... G09G 3/36; G09G 3/3648; G09G 3/3688; G09G 3/3696
USPC .................... 345/87–100, 102, 211–213, 690
See application file for complete search history.

(56) References Cited

U.S. PATENT DOCUMENTS

| | | | |
|---|---|---|---|
| 5,155,613 A | 10/1992 | Sakayori | |
| 5,534,884 A | 7/1996 | Mase et al. | |
| 5,731,856 A | 3/1998 | Kim et al. | |
| 5,744,864 A | 4/1998 | Cillessen et al. | |
| 5,767,832 A | 6/1998 | Koyama et al. | |
| 5,982,471 A | 11/1999 | Hirakata et al. | |
| 6,169,532 B1 * | 1/2001 | Sumi et al. | ...................... 345/98 |

(Continued)

FOREIGN PATENT DOCUMENTS

| | | |
|---|---|---|
| CN | 100470612 C | 3/2009 |
| EP | 1349141 A | 10/2003 |

(Continued)

OTHER PUBLICATIONS

Tsuda.K et al., "Ultra Low Power Consumption Technologies for Mobile TFT-LCDs," IDW '02: Proceedings of the 9th International Display Workshops, Dec. 4, 2002, pp. 295-298.

(Continued)

*Primary Examiner* — Jennifer Nguyen
(74) *Attorney, Agent, or Firm* — Eric J. Robinson; Robinson Intellectual Property Law Office, P.C.

(57) ABSTRACT

It is an object to provide a liquid crystal display device and a driving method of a liquid crystal display device in each of which deterioration of an image display function can be suppressed and power consumption can be sufficiently reduced. In the liquid crystal display device, a fixed potential is input to a capacitor before a power source is turned off, so that a potential difference between electrodes of the capacitor disappears (capacitance becomes almost zero) such that electric field is not applied to liquid crystals, whereby the liquid crystals are in an initial state. When the supply of the power source is stopped after an initial-state image is displayed, unnecessary electric field is not continuously applied to the liquid crystals in an off state, whereby the liquid crystals can be in the stable initial state; therefore, the liquid crystals can be prevented from deteriorating.

19 Claims, 13 Drawing Sheets

(56) References Cited

U.S. PATENT DOCUMENTS

| | | |
|---|---|---|
| 6,225,969 B1 | 5/2001 | Ishii |
| 6,266,038 B1* | 7/2001 | Yoshida et al. .................. 345/92 |
| 6,294,274 B1 | 9/2001 | Kawazoe et al. |
| 6,480,181 B2 | 11/2002 | Ishii |
| 6,563,174 B2 | 5/2003 | Kawasaki et al. |
| 6,727,522 B1 | 4/2004 | Kawasaki et al. |
| 6,803,898 B2 | 10/2004 | Ishii |
| 6,961,042 B2* | 11/2005 | Murai ............................. 345/92 |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,098,880 B2 | 8/2006 | Inoue et al. |
| 7,105,868 B2 | 9/2006 | Nause et al. |
| 7,211,825 B2 | 5/2007 | Shih et al |
| 7,282,782 B2 | 10/2007 | Hoffman et al. |
| 7,286,108 B2 | 10/2007 | Tsuda et al. |
| 7,297,977 B2 | 11/2007 | Hoffman et al. |
| 7,321,353 B2 | 1/2008 | Tsuda et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,601,984 B2 | 10/2009 | Sano et al. |
| 7,674,650 B2 | 3/2010 | Akimoto et al. |
| 7,732,819 B2 | 6/2010 | Akimoto et al. |
| 7,737,517 B2 | 6/2010 | Kawamura et al. |
| 7,791,072 B2 | 9/2010 | Kumomi et al. |
| 7,791,074 B2 | 9/2010 | Iwasaki |
| 8,067,775 B2 | 11/2011 | Miyairi et al. |
| 8,436,799 B2 | 5/2013 | Credelle |
| 2001/0015710 A1* | 8/2001 | Hirakata ......................... 345/87 |
| 2001/0020928 A1 | 9/2001 | Yanagisawa et al. |
| 2001/0046027 A1 | 11/2001 | Tai et al. |
| 2002/0003271 A1* | 1/2002 | Ikeda et al. .................... 257/410 |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager et al. |
| 2004/0038446 A1 | 2/2004 | Takeda et al. |
| 2004/0127038 A1 | 7/2004 | Carcia et al. |
| 2004/0246280 A1 | 12/2004 | Credelle et al. |
| 2005/0017302 A1 | 1/2005 | Hoffman |
| 2005/0199959 A1 | 9/2005 | Chiang et al. |
| 2005/0219188 A1* | 10/2005 | Kawabe et al. .................. 345/94 |
| 2006/0022932 A1* | 2/2006 | Sagawa et al. .................. 345/98 |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0205976 A1 | 9/2007 | Takatori et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0042968 A1* | 2/2008 | Oh ................................ 345/102 |
| 2008/0050595 A1 | 2/2008 | Nakagawara et al. |
| 2008/0055218 A1 | 3/2008 | Tsuda et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0284970 A1 | 11/2008 | Ishitani |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0079684 A1* | 3/2009 | Watanabe ....................... 345/92 |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0261325 A1 | 10/2009 | Kawamura et al. |
| 2009/0278122 A1 | 11/2009 | Hosono et al. |
| 2009/0280600 A1 | 11/2009 | Hosono et al. |
| 2010/0025678 A1 | 2/2010 | Yamazaki et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2010/0244020 A1 | 9/2010 | Sakata et al. |
| 2011/0148826 A1 | 6/2011 | Koyama et al. |
| 2011/0148846 A1 | 6/2011 | Arasawa et al. |
| 2011/0175894 A1 | 7/2011 | Wakimoto et al. |
| 2012/0061668 A1 | 3/2012 | Miyairi et al. |

FOREIGN PATENT DOCUMENTS

| | | |
|---|---|---|
| EP | 1737044 A | 12/2006 |
| EP | 2226847 A | 9/2010 |
| EP | 2267693 A | 12/2010 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 09-090317 A | 4/1997 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2003-131633 A | 5/2003 |
| JP | 2003-295829 A | 10/2003 |
| JP | 2004-103957 A | 4/2004 |
| JP | 2004-273614 A | 9/2004 |
| JP | 2004-273732 A | 9/2004 |

(56) References Cited

FOREIGN PATENT DOCUMENTS

| | | |
|---|---|---|
| JP | 2006-047500 A | 2/2006 |
| JP | 2006-165527 A | 6/2006 |
| JP | 2007-096055 A | 4/2007 |
| JP | 2007-123861 A | 5/2007 |
| JP | 2009-042263 A | 2/2009 |
| JP | 2009-099887 A | 5/2009 |
| JP | 2009-186542 A | 8/2009 |
| TW | 455725 | 9/2001 |
| TW | 200527362 | 8/2005 |
| TW | 200807361 | 2/2008 |
| WO | WO-2004/114391 | 12/2004 |
| WO | WO-2005/001805 | 1/2005 |

OTHER PUBLICATIONS

International Search Report (Application No. PCT/JP2010/073851) Dated Feb. 1, 2011.

Written Opinion (Application No. PCT/JP2010/073851) Dated Feb. 1, 2011.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Kimizuka.N. et al., "Spinel, YBFE2O4, and YB2FE3O7 Types of Structures for Compounds in the In2O3 and SC2O3-A2O3-BO Systems [A; Fe, Ga, Or Al; B: Mg, Mn, Fe, Ni, Cu,or Zn] At Temperatures Over 1000° C.", Journal of Solid State Chemistry, 1985, vol. 60, pp. 382-384.

Nakamura.M et al., "The phase relations in the In2O3-Ga2ZnO4-ZnO system at 1350° C.", Journal of Solid State Chemistry, Aug. 1, 1991, vol. 93, No. 2, pp. 298-315.

Kitzerow.H et al., "Observation of Blue Phases in Chiral Networks", Liquid Crystals, 1993, vol. 14, No. 3, pp. 911-916.

Kimizuka.N. at al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3-ZnGa2O4-ZnO System", Journal of Solid State Chemistry, Apr. 1, 1995, vol. 116, No. 1, pp. 170-178.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Prins.M et al., "A Ferroelectric Transparent Thin-Film Transistor", Appl. Phys. Lett. (Applied Physics Letters), Jun. 17, 1996, vol. 68, No. 25, pp. 3650-3652.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Kikuchi.H et al., "Polymer-Stabilized Liquid Crystal Blue Phases", Nature Materials, Sep. 2, 2002, vol. 1, pp. 64-68.

Nomura.K et al., "Thin-Film Transistor Fabricated in Single-Crystalline Transparent Oxide Semiconductor", Science, May 23, 2003, vol. 300, No. 5623, pp. 1269-1272.

Ikeda.T et al., "Full-Functional System Liquid Crystal Display Using CG-Silicon Technology", SID Digest '04 : SID International Symposium Digest of Technical Papers, 2004, vol. 35, pp. 860-863.

Nomura.K et al., "Room-Temperature Fabrication of Transparent Flexible Thin-Film Transistors using Amorphous Oxide Semiconductors", Nature, Nov. 25, 2004, vol. 432, pp. 488-492.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Kanno.H at al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Lee.H et al., "Current Status of, Challenges to, and Perspective View of AM-OLED ", IDW '06 : Proceedings of the 13th International Display Workshops, Dec. 7, 2006, pp. 663-666.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Hirao.T et al., "Novel Top-Gate Zinc Oxide Thin-Film Transistors (ZnO TFTs) for AMLCDS", Journal of the SID, 2007, vol. 15, No. 1, pp. 17-22.

Park.S at al., "Challenge to Future Displays: Transparent AM-OLED Driven by PEALD Grown ZnO TFT", IMID '07 Digest, 2007, pp. 1249-1252.

Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.

Miyasaka.M, "SUFTLA Flexible Microelectronics on Their Way to Business", SID Digest '07 : SID International Symposium Digest of Technical Papers, 2007, vol. 38, pp. 1673-1676.

Kurokawa.Y et al., "UHF RFCPUS on Flexible and Glass Substrates for Secure RFID Systems", Journal of Solid-State Circuits , 2008, vol. 43, No. 1, pp. 292-299.

Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.

Lee.J et al., "World'S Largest (15-Inch) XGA AMLCD Panel Using IGZO Oxide TFT", SID Digest '08 : SID International Symposium Digest of Technical Papers, May 20, 2008, vol. 39, pp. 625-628.

Park.J et al., "Amorphous Indium-Gallium-Zinc Oxide TFTs and Their Application for Large Size AMOLED", AM-FPD '08 Digest of Technical Papers, Jul. 2, 2008, pp. 275-278.

Takahashi.M et al., "Theoretical Analysis of IGZO Transparent Amorphous Oxide Semiconductor", IDW '08 : Proceedings of the 15th International Displays Workshops, Dec. 3, 2008, pp. 1637-1640.

Sakata.J et al., "Development of 4.0-In. AMOLED Display With Driver Circuit Using Amorphous In-Ga-Zn-Oxide TFTs", IDW'09 : Proceedings of the 16th International Display Workshops, 2009, pp. 689-692.

Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.

Nowatari.H et al., "60.2: Intermediate Connector With Suppressed Voltage Loss for White Tandem OLEDs". SID Digest '09 : SID International Symposium Disgest of Technical Papers, May 31, 2009, vol. 40, pp. 899-902.

Jin.D et al., "65.2:Distinguished Paper:World-Largest (6.5") Flexible Full Color Top Emission AMOLED Display on Plastic Film and Its Bending Properties", SID Digest '09 : SID International Symposium Digest of Technical Papers, May 31, 2009, pp. 983-985.

Lee.M et al., "15.4:Excellent Performance of Indium-Oxide-Based Thin-Film Transistors by DC Sputtering", SID Digest '09 : SID International Symposium Digest of Technical Papers, May, 31, 2009, pp. 191-193.

Cho.D et al., "21.2:Al and Sn-Doped Zinc Indium Oxide Thin Film Transistors for AMOLED Back-Plane". SID Digest '09 : SID International Symposium Digest of Technical Papers, May, 31, 2009, pp. 280-283.

Kikuchi.H et al., "39.1:Invited Paper:Optically Isotropic Nano-Structured Liquid Crystal Composites for Display Applications", SID Digest '09 : SID International Symposium Digest of Technical Papers, May, 31, 2009, pp. 578-581.

Osada.T et al., "15.2: Development of Driver-Integrated Panel using Amorphous In-Ga-Zn-Oxide TFT", SID Digest '09 : SID International Symposium Digest of Technical Papers, May, 31, 2009, pp. 184-187.

(56) References Cited

OTHER PUBLICATIONS

Ohara.H et al., "21.3:4.0 In. QVGA AMOLED Display Using In-Ga-Zn-Oxide TFTs With a Novel Passivation Layer", SID Digest '09 : SID International Symposium Digest of Technical Papers, May, 31, 2009, pp. 284-287.

Godo.H et al., "P-9:Numerical Analysis on Temperature Dependence of Characteristics of Amorphous In-Ga-Zn-Ozide TFT", SID Digest '09 : SID International Symposium Digest of Technical Papers, May, 31, 2009, pp. 1110-1112.

Osada.T et al., "Development of Driver-Integrated Panel Using Amorphous In-Ga-Zn-Oxide TFT", AM-FPD '09 Digest of Technical Papers, Jul. 1, 2009, pp. 33-36.

Godo.H et al., "Temperature Dependence of Characteristics and Electronic Structure for Amorphous In-Ga-Zn-Oxide TFT", AM-FPD '09 Digest of Technical Papers, Jul. 1, 2009, pp. 41-44.

Ohara.H et al., "Amorphous In-Ga-Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Park.J et al., "High performance amorphous oxide thin film transistors with self-aligned top-gate structure", IEDM 06: Technical Digest of International Electron Devices Meeting, Dec. 7, 2009, pp. 191-194.

Nakamura.M, "Synthesis of Homologous Compound with New Long-Period Structure", Nirim Newsletter, Mar. 1, 1995, vol. 150, pp. 1-4.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

Orita.M et al., "Amorphous transparent conductive oxide $InGaO_3(ZnO)_m$ (m<4):a Zn4s conductor", Philosophical Magazine, 2001, vol. 81, No. 5, pp. 501-515.

Janotti.A et al., "Oxygen Vacancies in ZnO", Appl. Phys. Lett. (Applied Physics Letters) , 2005, vol. 87, pp. 122102-1-122102-3.

Clark.S et al., "First Principles Methods Using CASTEP", Zeitschrift fur Kristallographie, 2005, vol. 220, pp. 567-570.

Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 5B, pp. 4303-4308.

Janotti.A et al., "Native Point Defects in ZnO", Phys. Rev. B (Physical Review. B), Oct. 4, 2007, vol. 76, No. 16, pp. 165202-1-165202-22.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Park.J et al., "Improvements in the Device Characteristics of Amorphous Indium Gallium Zinc Oxide Thin-Film Transistors by AR Plasma Treatment", Appl. Phys. Lett. (Applied Physics Letters), Jun. 26, 2007, vol. 90, No. 26, pp. 262106-1-262106-3.

Park.J at al., "Electronic Transport Properties of Amorphous Indium-Gallium-Zinc Oxide Semiconductor Upon Exposure to Water", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States", SID Digest '08 : SID International Symposium Digest of Technical Papers, 2008, vol. 39, pp. 1277-1280.

Oba.F et al., "Defect energetics in ZnO: A hybrid Hartree-Fock density functional study", Phys. Rev. B (Physical Review B), 2008, vol. 77, pp. 245202-1-245202-6.

Kim.S et al., "High-Performance oxide thin film transistors passivated by various gas plasmas", 214th ECS Meeting, 2008, No. 2317, ECS.

Hayashi.R et al., "42.1: Invited Paper: Improved Amorphous In-Ga-Zn-O TFTs", SID Digest '08 SID International Symposium Digest of Technical Papers, May 20, 2008, vol. 39, pp. 621-624.

Son.K et al., "42.4L: Late-News Paper: 4 Inch QVGA AMOLED Driven by the Threshold Voltage Controlled Amorphous GIZO ($Ga_2O_3$-$In_2O_3$-ZnO) TFT", SID Digest '08 : SID International Symposium Digest of Technical Papers, May 20, 2008, vol. 39, pp. 633-636.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Fung.T et al., "2-D Numerical Simulation of High Performance Amorphous In-Ga-Zn-O TFTs for Flat Panel Displays", AM-FPD '08 Digest of Technical Papers, Jul. 2, 2008, pp. 251-252, The Japan Society of Applied Physics.

Mo.Y et al., "Amorphous Oxide TFT Backplanes for Large Size AMOLED Displays", IDW '08 : Proceedings of the 6th International Display Workshops, Dec. 3, 2008, pp. 581-584.

Asakuma.N et al. "Crystallization and Reduction of Sol-Gel Derived Zinc Oxide Films by Irradiation with Ultraviolet Lamp", Journal of Sol-Gel Science and Technology, 2003, vol. 26, pp. 181-184.

Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.

Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Ueno.K et al., "Field-Effect Transistor on $SrTiO_3$ With Sputtered $Al_2O_3$ Gate Insulator", Appl. Phys. Lett. (Applied Physics Letters) , Sep. 1, 2003, vol. 83, No. 9, pp. 1755-1757.

Nomura.K et al., "Carrier transport in transparent oxide semiconductor with intrinsic structural randomness probed using single-crystalline $InGaO_3(ZnO)_5$ films", Appl. Phys. Lett. (Applied Physics Letters) , Sep. 13, 2004, vol. 85, No. 11, pp. 1993-1995.

Chinese Office Action (Application No. 201080061985.9) Dated Jul. 28, 2014.

* cited by examiner

DRIVING METHOD OF LIQUID CRYSTAL DISPLAY DEVICE

TECHNICAL FIELD

The present invention relates to a method for driving a liquid crystal display device and a liquid crystal display device.

BACKGROUND ART

A technique for forming a thin film transistor (TFT) by using a semiconductor thin film formed over a substrate having an insulating surface has attracted attention. Thin film transistors are applied to a wide range of electronic devices such as integrated circuits (IC) or image display devices (display devices).

As examples of electronic devices using thin film transistors, mobile devices such as a mobile phone or a laptop computer can be given. For such a mobile electronic device, power consumption that affects continuous operation time is a big problem. Also for a television set which is increasing in size, it is important to suppress the increase in power consumption associated with the increase in size.

In a display device, when image data which is input to a pixel is rewritten, operation of writing the same image data is performed once again even in the case where image data in a period is the same as that in the preceding period. As a result, by performing the operation of writing the same image data a plurality of times, power consumption is increased. In order to suppress such increase in power consumption in a display device, for example, a technique has been disclosed in which an idle period which is longer than a scanning period is set as a non-scanning period every time after image data is written by scanning a screen in the case of displaying a still image (for example, see Patent Document 1 and Non-Patent Document 1).

REFERENCE

Patent Document

[Patent Document 1] U.S. Pat. No. 7,321,353

Non-Patent Document

[Non-Patent Document 1] K. Tsuda et al., IDW '02, Proc., pp. 295-298

DISCLOSURE OF INVENTION

However, with the display method in which a still image display is maintained by setting an idle period which is longer than a scanning period after image data is written by scanning a screen once, given voltage is continuously applied to liquid crystals; therefore, there is a problem in that liquid crystals are deteriorated and the image display function is suppressed. Further, if the image data remains, the image data may remain on a screen even after the power source of the display device is turned off.

Accordingly, an object of one embodiment of the present invention is to suppress the above-described deterioration of the image display function in a liquid crystal display device.

Another object of one embodiment of the present invention is to provide a liquid crystal display device in which power consumption can be reduced and a driving method of the liquid crystal display device.

A liquid crystal display device operates when the supply of electric power is started and does not operate when the supply of electric power is stopped. In this specification, a state where electric power is supplied to the liquid crystal display device (a state where a power source is ON) is referred to as an on state, and a state where the supply of electric power is stopped (a state where a power source is OFF) is referred to as an off state. A control signal for turning on the liquid crystal display device is referred to as a start signal, and a control signal for turning off the liquid crystal display device is referred to as a stop signal.

A liquid crystal element provided in the liquid crystal display device includes a pixel electrode, a common electrode, and liquid crystals provided between the pixel electrode and the common electrode. By applying different potentials to the pixel electrode and the common electrode, voltage is applied to the liquid crystal element. When voltage is applied to the liquid crystal element, electric field is generated and applied to the liquid crystals; therefore, the liquid crystals respond, so that an image is displayed.

On the other hand, when the same potential is applied to the pixel electrode and the common electrode, the potential difference does not occur between the electrodes, whereby voltage is not applied to the liquid crystal element. Therefore, electric field is not generated in the liquid crystal element and is not applied to the liquid crystals, whereby the liquid crystals do not respond. In this specification, a state of liquid crystals to which electric field is not applied (a non-response state) is referred to as an initial state (a liquid crystal initial state).

In the display device which is in the on state by the supply of the start signal, electric field is applied to the liquid crystals which is in the initial state; therefore, the liquid crystals respond and an image is displayed. Then, in the display device in the off state by the supply of the stop signal, the liquid crystals return to the initial state.

A liquid crystal display device disclosed in this specification has a pixel structure in which a charge is accumulated in a capacitor and voltage applied to the liquid crystals is maintained by the charge, whereby a display image is maintained. In the on state of the above liquid crystal display device, a semiconductor element whose current value in the off state (an off-state current value) is low is preferably used as a switching element which is electrically connected to the capacitor and the liquid crystal element.

If the semiconductor element whose off-state current value is low is used as a switching element, the charge does not easily leak from the capacitor through the semiconductor element, whereby voltage applied to the liquid crystal element can be maintained for long period. Accordingly, a liquid crystal display device with high display-image maintaining property can be provided.

On the other hand, in a pixel in which the supply of electric power is stopped to be in the off state, the charge held by the capacitor needs to be completely discharged through the semiconductor element so that the liquid crystals to which electric field is applied and which are in the response state can return to the initial state. In a period during which the charge of the capacitor is discharged, electric field is continuously applied to the liquid crystals; therefore, the longer the period is, the more the deterioration of the liquid crystals is accelerated. In a period during which the charge of the capacitor is discharged, liquid crystals are responding and an image is maintained; therefore, in the case of a reflective liquid crystal display device in which external light is utilized as a light source, the image may remain even after the power source is turned off (the image is seen as an afterimage), which is reduction in display quality.

As described above, if unnecessary electric field is continuously applied to liquid crystals in the off state where an image is not displayed, the image display function and reliability as a liquid crystal display device may be deteriorated.

In a liquid crystal display device disclosed in this specification, a fixed potential is input to a capacitor before the power source is turned off, so that a potential difference between electrodes of the capacitor disappears (capacitance becomes almost zero) such that electric field is not applied to the liquid crystals, whereby the liquid crystals are in the initial state. Note that in this specification, an image displayed with liquid crystals in the initial state is referred to as an initial-state image. For example, in the case of a normally-white liquid crystal display device, the initial-state image is an all white image, and in the case of a normally-black liquid crystal display device, the initial-state image is an all black image. In the case of the normally-white liquid crystal display device, the initial-state display can be a single-colored display with a color filter or a light source.

When the power source is turned off after the initial-state image is displayed, unnecessary electric field is not continuously applied to the liquid crystals in the off state, whereby the liquid crystals can be in a stable initial state.

Since the liquid crystal display device is in the off state after displaying the initial-state image such as the all white image or the all black image, it can be prevented that image information displayed just before the liquid crystal display device is turned off is leaked to others, which occurs when an afterimage or the like is displayed on the screen.

Accordingly, a liquid crystal display device in which favorable image display function can be maintained for long period and security is high can be provided.

An embodiment of a driving method of a liquid crystal display device disclosed in this specification includes: displaying an image on a screen provided with pixels each including a capacitor, a liquid crystal element, and a semiconductor element by supplying a power source potential from a power source and causing a liquid crystals of the liquid crystal element to respond; supplying a stop signal by a stop unit; displaying an initial-state image on the screen by writing a fixed potential to the capacitor of each of the pixels in accordance with the stop signal and changing a state of the liquid crystals from a response state to a non-response state; and stopping the supply of the power source potential from the power source.

An embodiment of a driving method of a liquid crystal display device disclosed in this specification includes: displaying an image on a screen provided with pixels each including a capacitor, a liquid crystal element, and a semiconductor element by supplying a power source potential from a power source to a driver circuit portion and causing a liquid crystal of the liquid crystal element to respond; supplying a stop signal by a stop unit; displaying an initial-state image on the screen by writing a fixed potential to the capacitor of each of the pixels in accordance with the stop signal and changing a state of the liquid crystals from a response state to a non-response state; and stopping the supply of the power source potential from the power source to the driver circuit portion.

An embodiment of a driving method of a liquid crystal display device disclosed in this specification includes: displaying an image on a screen provided with pixels each including a capacitor, a liquid crystal element, and a semiconductor element by supplying a power source potential from a power source to a driver circuit portion and a backlight portion and causing a liquid crystal of the liquid crystal element to respond; supplying a stop signal by a stop unit; stopping the supply of the power source potential from the power source to the backlight portion; displaying an initial-state image on the screen by writing a fixed potential to the capacitor of each of the pixels in accordance with the stop signal and changing a state of the liquid crystals from a response state to a non-response state; and stopping the supply of the power source potential from the power source to the driver circuit portion.

An embodiment of a driving method of a liquid crystal display device disclosed in this specification includes: displaying an image on a screen provided with pixels each including a capacitor, a liquid crystal element, and a semiconductor element by supplying a power source potential from a power source to a driver circuit portion and a backlight portion and causing a liquid crystal of the liquid crystal element to respond; supplying a stop signal by a stop unit; displaying an initial-state image on the screen by writing a fixed potential to the capacitor of each of the pixels in accordance with the stop signal and changing a state of the liquid crystals from a response state to a non-response state; and stopping the supply of the power source potential from the power source to the driver circuit portion and the backlight portion.

In the above-described structure, a transistor including an oxide semiconductor layer can be used as a semiconductor element functioning as a switching element that is electrically connected to a capacitor and a liquid crystal element.

Before the liquid crystal display device is in the off state, the fixed potential is written such that voltage is not applied to the liquid crystal element, and an initial-state image is displayed. Accordingly, the liquid crystal element can be prevented from deteriorating, favorable image display function can be maintained for long period, and security can be improved.

As a result, a liquid crystal display device with high reliability and low power consumption can be achieved.

BEST MODE FOR CARRYING OUT THE INVENTION

Hereinafter, embodiments of the present invention will be described in detail with reference to the accompanying drawings. However, the present invention is not limited to the description below, and it is easily understood by those skilled in the art that embodiments and details disclosed herein can be modified in various ways. In addition, the present invention is not construed as being limited to description of the embodiments.

Embodiment 1

In this embodiment, one embodiment of a liquid crystal display device and that of a driving method of a liquid crystal display device are described with reference to FIG. 1 and FIG. 2.

The liquid crystal display device of this embodiment will be described with reference to a flow chart of FIG. 1.

Figure 1:
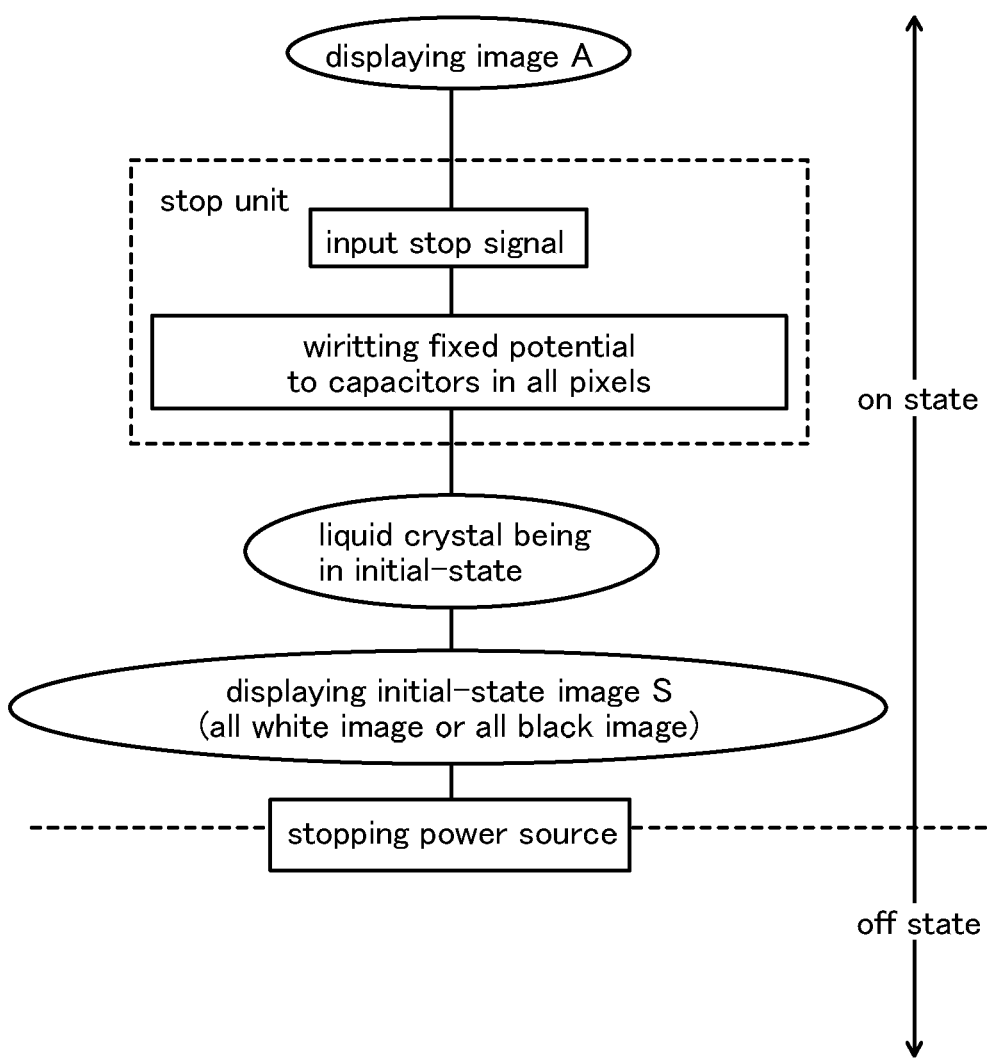
FIG. 1 is a diagram illustrating one embodiment of a liquid crystal display device.
Figure 2:
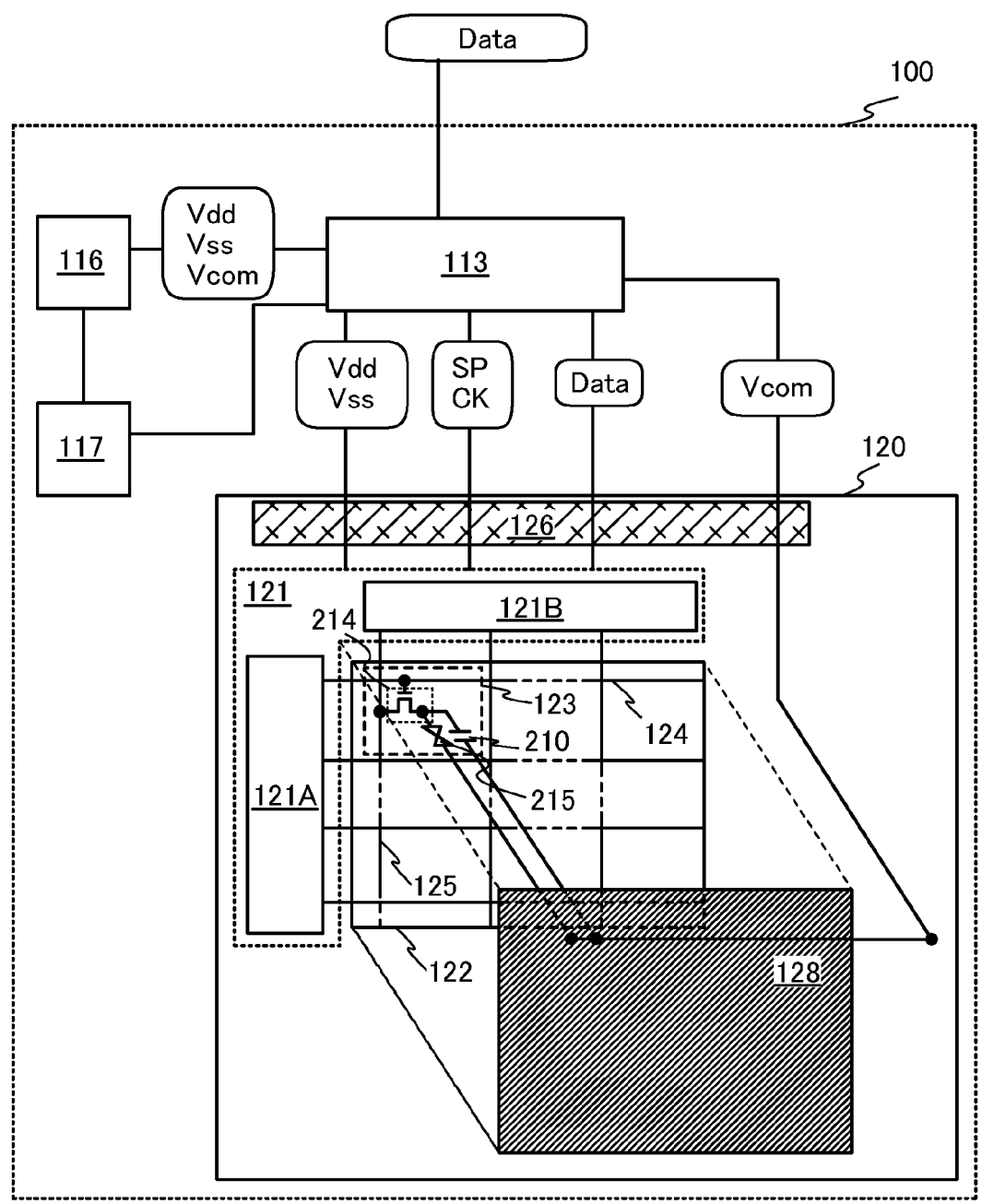
FIG. 2 is a diagram illustrating one embodiment of a liquid crystal display device.

As illustrated in FIG. 1, an image A is displayed on a display screen of the liquid crystal display device. When another display image obtained by the supply of another image signal is not needed (when use of the liquid crystal display device is finished), a stop unit is selected. After the stop unit is selected, a stop signal is input and a fixed potential is written to capacitors of all the pixels. By writing the fixed potential to the capacitor, a potential difference between electrodes of the capacitor disappears (in other words, capacitance becomes almost zero), whereby liquid crystals in a response state are switched to the initial state of the non-response state. Accordingly, an initial-state image S that is displayed by the liquid crystals in the initial state is displayed on the display screen. For example, in the case of a normally-white liquid crystal display device, the initial-state image S is displayed in all white, and in the case of a normally-black liquid crystal display device, the initial-state image S is displayed in all black. In the case of the normally-white liquid crystal display device, the initial-state display can be a single-colored display with a color filter or a light source.

After the initial-state image S is displayed, a power source is stopped and the supply of a power source potential to a display panel is stopped, whereby the liquid crystal display device is in the off state. Therefore, unnecessary electric field is not continuously applied to the liquid crystals in the off state, whereby the liquid crystals can be in a stable initial state.

Since the liquid crystal display device is in the off state after displaying the initial-state image such as the all white image or the all black image, it can be prevented that image information displayed just before the liquid crystal display device is turned off is leaked to others, which occurs when an afterimage or the like is displayed on the screen.

Therefore, a liquid crystal display device in which favorable image display function can be maintained for long period and security is high can be provided.

Each configuration of a liquid crystal display device 100 of this embodiment will be described with reference to a block diagram of FIG. 2. The liquid crystal display device 100 includes a power source 116, a stop unit 117, a display control circuit 113, and a display panel 120. In the case of a transmissive liquid crystal display device or a semi-transmissive liquid crystal display device, a backlight portion as a light source may be also provided.

To the liquid crystal display device 100, an image signal (an image signal Data) is supplied from an external device connected to the liquid crystal display device. A power source potential (a high power source potential $V_{dd}$, a low power source potential $V_{ss}$, and a common potential $V_{com}$) is supplied when the power source 116 of the liquid crystal display device is in the on state and the power supply is started. The control signal (a start pulse SP and a clock signal CK) is supplied from the display control circuit 113. The supply of the power source potential (the high power source potential $V_{dd}$, the low power source potential $V_{ss}$, and the common potential $V_{com}$) is stopped by the control of the stop unit 117. After the initial-state image is displayed, the power source 116 is turned off, so that the supply of the power source potential to the display panel is stopped.

Note that the high power source potential $V_{dd}$ is a potential higher than a reference potential, and the low power source potential $V_{ss}$ is a potential lower than or equal to the reference potential. Note that it is desirable that each of the high power source potential $V_{dd}$ and the low power source potential $V_{ss}$ be a potential such that a transistor can operate. Note that the difference between the high power source potential $V_{dd}$ and the low power source potential $V_{ss}$ is referred to as a power source voltage in some cases.

The common potential $V_{com}$ may be any fixed potential as long as it serves as reference with respect to a potential of an image signal Data supplied to a pixel electrode. For example, the common potential $V_{com}$ may be a ground potential.

Note that the image signal Data may be appropriately inverted in accordance with dot inversion driving, source line inversion driving, gate line inversion driving, frame inversion driving, or the like to be input to the liquid crystal display device 100. In the case where an image signal Data is an analog signal, the image signal Data may be converted into a digital signal through an A/D converter or the like to be supplied to the liquid crystal display device 100.

In this embodiment, a common electrode 128 and one electrode of a capacitor 210 are provided with the common potential $V_{com}$ that is a fixed potential through the display control circuit 113 from the power source 116.

The display control circuit 113 is a circuit which supplies a display panel image signal (Data), the control signal (specifically, the start pulse SP, the clock signal CK, and the like), and the power source potential (the high power source potential $V_{dd}$, the low power source potential $V_{ss}$, and the common potential $V_{com}$) to the display panel 120.

The display panel 120 has a structure in which a liquid crystal element 215 is sandwiched between a pair of substrate (a first substrate and a second substrate). The first substrate is provided with a driver circuit portion 121 and a pixel portion 122. The second substrate is provided with a common connection portion (also referred to as a common contact) and the common electrode 128 (also referred to as a counter electrode). The common connection portion electrically connects a first substrate and a second substrate. The common connection portion may be provided over the first substrate.

In the pixel portion 122, a plurality of gate lines (scan lines) 124 and a plurality of source lines (signal lines) 125 are provided. A plurality of pixels 123 is arranged in matrix so that each of pixels 123 is surrounded by the gate lines 124 and the source lines 125. In the display panel described in this embodiment, the gate lines 124 and the source lines 125 are extended from a gate line driver circuit 121A and a source line driver circuit 121B, respectively.

In addition, the pixel 123 includes a transistor 214 as a switching element, the capacitor 210 connected to the transistor 214, and the liquid crystal element 215.

The liquid crystal element 215 is an element that controls transmission and non-transmission of light by the optical modulation action of liquid crystals. The optical modulation action of liquid crystals is controlled by electric field applied to the liquid crystals. The direction of the electric field applied to the liquid crystals varies according to a liquid crystal material, a driving method, and an electrode structure and is selected as appropriate. For example, in the case where a driving method in which electric field is applied in a thickness direction (a so-called vertical direction) of a liquid crystal layer is used, the first substrate and the second substrate may be provided with the pixel electrode and the common electrode, respectively, with the liquid crystals provided between the first substrate and the second substrate. In the case where a driving method in which electric field is applied in an in-plane direction (a so-called horizontal direction) is used, the pixel electrode and the common electrode may be provided on the same substrate with respect to the liquid crystals. The pixel electrode and the common electrode may have a variety of opening patterns. In this embodiment, there is no particular limitation on a liquid crystal material, a driving method, and an electrode structure as long as an element controls transmission and non-transmission of light by the optical modulation action.

In the transistor 214, one of the plurality of gate lines 124 provided in the pixel portion 122 is connected to the gate electrode, one of a source electrode and a drain electrode is connected to one of the plurality of source lines 125, and the other of the source electrode and the drain electrode is connected to one of the electrodes of the capacitor 210 and one of the electrodes of the liquid crystal element 215 (pixel electrode).

A transistor having low off-state current is preferably used for the transistor 214. When the transistor 214 is in the off state, electric charges accumulated in the liquid crystal element 215 and the capacitor 210 which are connected to the transistor 214 having low off-state current are hardly leaked through the transistor 214, so that the state where data is written before the transistor 214 is switched to the off state can be maintained for long time.

With such a structure, the capacitor 210 can hold voltage applied to the liquid crystal element 215. The electrode of the capacitor 210 may be connected to a capacitor line additionally provided.

The driver circuit portion 121 includes the gate line driver circuit 121A and the source line driver circuit 121B. The gate line driver circuit 121A and the source line driver circuit 121B are driver circuits for driving the pixel portion 122 that includes the plurality of pixels and each include a shift register circuit (also referred to as a shift register).

Note that the gate line driver circuit 121A and the source line driver circuit 121B may be formed over the same substrate as the pixel portion 122 or over a different substrate from the pixel portion 122.

Note that the high power source potential $V_{dd}$, the low power source potential $V_{ss}$, the start pulse SP, the clock signal CK, and the image signal Data which are controlled by the display control circuit 113 are supplied to the driver circuit portion 121.

A terminal portion 126 is an input terminal which supplies a predetermined signal output from the display control circuit 113 (such as the high power source potential $V_{dd}$, the low power source potential $V_{ss}$, the start pulse SP, the clock signal CK, the image signal Data, and the common potential $V_{com}$) and the like, to the driver circuit portion 121.

The common electrode 128 is electrically connected to a common potential line for supplying the common potential $V_{com}$ which is controlled by the display control circuit 113, in the common connection portion.

As a specific example of the common connection portion, the common electrode 128 and the common potential line can be electrically connected with a conductive particle in which an insulating sphere is covered with a thin metal film provided therebetween. Note that two or more common connection portions may be provided in the display panel 120.

The liquid crystal display device may include a photometric circuit. The liquid crystal display device provided with the photometric circuit can detect the brightness of the environment where the liquid crystal display device is put. As a result, the display control circuit 113 connected to the photometric circuit can control a driving method of a light source such as a backlight and a sidelight in accordance with a signal input from the photometric circuit.

Color display can be performed by a combination with color filters. Also, other optical films (such as a polarizing film, a retardation film, or an anti-reflection film) can be used in combination. A light source such as a backlight that is used in a transmissive liquid crystal display device or a semi-transmissive liquid crystal display device may be selected and combined in accordance with the use of the liquid crystal display device 100. Further also, a planar light source may be formed using a plurality of LED light sources or a plurality of electroluminescent (EL) light sources. As the planar light source, three or more kinds of LEDs may be used and an LED emitting white light may be used. Note that the color filter is not always provided in the case where light-emitting diodes of RGB or the like are arranged in a backlight and a successive additive color mixing method (a field sequential method) in which color display is performed by time division is employed.

As described above, in the on state where the liquid crystal display device is turned on and electric power is supplied, low power consumption can be achieved with the use of a semiconductor element having low off-state current. Before the liquid crystal display device is in the off state, the fixed potential is written such that voltage is not applied to the liquid crystal element, and an initial-state image is displayed; therefore the liquid crystal element can be prevented from deteriorating, favorable image display function can be maintained for long period, and security can be improved.

Accordingly, a highly reliable liquid crystal display device in which low power consumption is achieved and a driving method of the liquid crystal display device can be provided.

Embodiment 2

In this embodiment, a driving method of a liquid crystal display device in which low power consumption can be achieved by a combination with Embodiment 1. The same portions as Embodiment 1 or portions having functions similar to those described in Embodiment 1 can be formed in a manner similar to that described in Embodiment 1; therefore, repetitive description is omitted. In addition, detailed description of the same portions is not repeated.

A liquid crystal display device displays images on a screen in a combination with a moving image and a still image. By switching of a plurality of different images corresponding to a plurality of frames at high speed, the images are recognized as the moving image by human eyes. Specifically, by switching of images at least 60 times (60 frames) per second, the images are recognized as a moving image with less flicker by human eyes. In contrast, unlike a moving image and a partial moving image, a still image is an image which does not change in successive frame periods, for example, in an n-th frame and an (n+1)th frame, when a plurality of images corresponding to a plurality of frame periods for time division are switched at high speed.

The liquid crystal display device according to the present invention can be operated in different display modes, a moving-image display mode and a still-image display mode, in the case of displaying a moving image and displaying a still image, respectively. In this specification, an image displayed in the still-image display mode is referred to as a still image.

In the case of displaying a moving image in which image signals in a series of frames are different (e.g., a first image signal corresponding to a first frame and a second image signal corresponding to a second frame are different to each other when the first frame and the second frame are successive frames), a display mode in which an image signal is written in each frame is used. In the case of displaying a still image in which image signals in a series of frames are the same (e.g., a first image signal corresponding to a first frame and a second image signal corresponding to a second frame are the same when the first frame and the second frame are successive frames), another image signal is not written, and a display mode in which a still image is displayed in such a way that potentials of the pixel electrode and the common electrode which apply voltage to the liquid crystal element are set to be in a floating state to maintain voltage applied to the liquid crystal element, so that a still image is displayed without supply of another potential.

The liquid crystal display device of this embodiment and a switching between the moving-image display mode and the still-image display mode of the liquid crystal display device will be described with reference to FIG. 3, FIG. 4, FIGS. 5A and 5B, FIG. 6, and FIG. 11.

Figure 11:
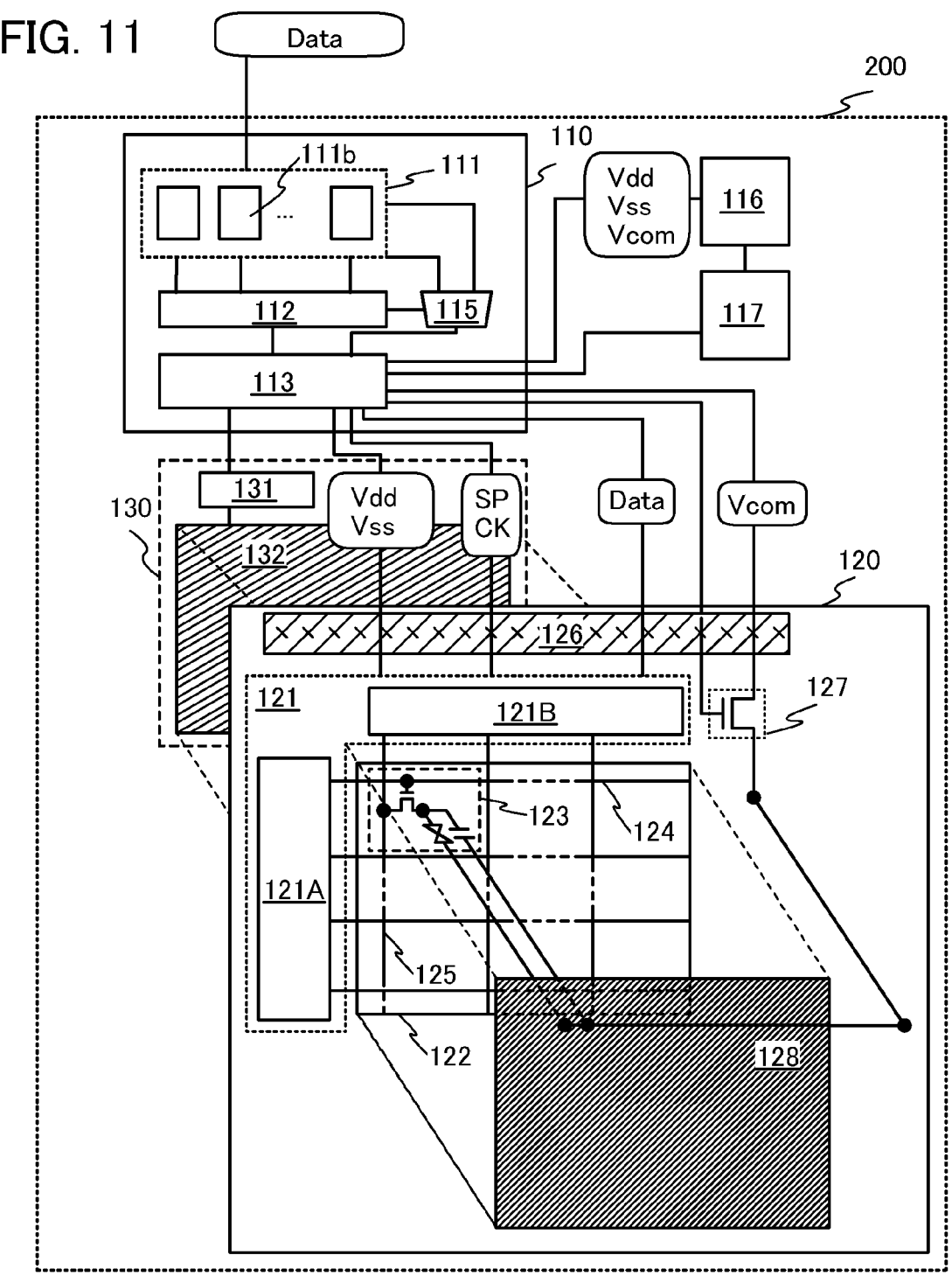
FIG. 11 is a diagram illustrating one embodiment of a liquid crystal display device.

Each configuration of a liquid crystal display device 200 of this embodiment will be described with reference to a block diagram of FIG. 11. The liquid crystal display device 200 is an example of a transmissive liquid crystal display device or a semi-transmissive liquid crystal display device in which display is performed by utilizing transmission or non-transmission of light in pixels. The liquid crystal display device 200 includes an image processing circuit 110, a power source 116, a stop unit 117, a display panel 120, and a backlight portion 130. In the case of a reflective liquid crystal display device, external light is utilized as a light source; therefore, the backlight portion 130 can be omitted.

To the liquid crystal display device 200, an image signal (an image signal Data) is supplied from an external device connected to the liquid crystal display device. Note that a power source potential (a high power source potential $V_{dd}$, a low power source potential $V_{ss}$, and a common potential $V_{com}$) is supplied when the power source 116 of the liquid crystal display device is turned on and the power supply is started. The control signal (a start pulse SP and a clock signal CK) is supplied from the display control circuit 113. The supply of the power source potential (the high power source potential $V_{dd}$, the low power source potential $V_{ss}$, and the common potential $V_{com}$) is stopped by the control of the stop unit 117. After the initial-state image is displayed, the power source 116 is turned off, so that the supply of the power source potential to the display panel is stopped.

In the case where the image signal Data is an analog signal, the image signal is preferably converted into a digital signal through an A/D converter or the like to be supplied to the image processing circuit 110 of the liquid crystal display device 200; because, when a difference of image signals is detected later, the difference can be detected easily.

A configuration of the image processing circuit 110 and a process in which the image processing circuit 110 processes a signal will be described.

The image processing circuit 110 includes a memory circuit 111, a comparison circuit 112, a display control circuit 113, and a selection circuit 115. The image processing circuit 110 generates a display-panel image signal and a backlight signal from the digital image signal Data that is input. The display-panel image signal is an image signal that controls the display panel 120. The backlight signal is a signal that controls the backlight portion 130. The image processing circuit 110 outputs a signal that controls a common electrode 128 to a switching element 127.

The memory circuit 111 includes a plurality of frame memories for storing image signals of a plurality of frames. The number of frame memories included in the memory circuit 111 is not particularly limited as long as the image signals of a plurality of frames can be stored. Note that the frame memory may be formed using a memory element such as dynamic random access memory (DRAM) or static random access memory (SRAM).

The number of frame memories is not particularly limited as long as the image signal can be stored for each frame period. Further, the image signals stored in the frame memories are selectively read out by the comparison circuit 112 and the display control circuit 113. A frame memory 111b in the diagram illustrates a memory region for one frame conceptually.

In one of these frame memories, an image signal of the initial-state image (e.g., an all white image or an all black image) in which liquid crystals are switched to the initial state of the non-response state, which is described in Embodiment 1, can be stored. The image signal of the initial-state image is read out by the display control circuit 113 when the stop signal is input, so that the image signal of the initial-state image is written to the screen.

The comparison circuit 112 is a circuit that selectively reads out image signals in successive frame periods stored in the memory circuit 111, compares the image signals in the successive frame periods in each pixel, and detects a difference thereof.

In this embodiment, depending on whether a difference of image signals between frames is detected or not, operations in the display control circuit 113 and the selection circuit 115 are determined. When a difference is detected in any of the pixels between frames by the comparison circuit 112 (when there is a difference), the comparison circuit 112 determines that the image signal is not a signal for displaying a still image and successive frame periods during which a difference is detected is a period during which a moving image is to be displayed.

On the other hand, when a difference is not detected in any of the pixels by comparing the image signals in the comparison circuit 112 (when there is no difference), the successive frame periods during which the difference is not detected is determined as period during which a still image is to be displayed. In other words, by detection of the differences in the comparison circuit 112, the image signals in successive frame periods are determined as image signals for displaying moving images or image signals for displaying still images.

Note that the criterion of determining that there is a difference by the comparison may be set such that the difference is recognized when the difference detected by the comparison circuit 104 exceeds a certain value. The comparison circuit 112 may be set to determine detection of a difference by the absolute value of the difference.

Although, in this embodiment, the structure in which an image is determined to be a moving image or a still image by detection of the difference between the image signals in successive frame periods by the comparison circuit 112 provided inside the liquid crystal display device 200 is described, a structure in which a signal as to whether the image is a still image or a moving image is supplied from the outside may be used.

The selection circuit 115 includes a plurality of switches, for example, switches formed using transistors. In the case where the comparison circuit 112 detects a difference in successive frame periods, that is, the image is a moving image, the selection circuit 115 selects an image signal of the moving image from the frame memories in the memory circuit 111 and outputs the image signal to the display control circuit 113.

Note that in the case where the comparison circuit 112 does not detect a difference in the successive frame periods, that is, the image is a still image, the selection circuit 115 does not output the image signal to the display control circuit 113 from the frame memories in the memory circuit 111. With the structure in which an image signal is not output to the display control circuit 113 from the frame memory, power consumption of the liquid crystal display device can be reduced.

Note that in the liquid crystal display device of this embodiment, a mode performed in such a way that the comparison circuit 112 determines the image signals as a still image is described as the still-image display mode, and a mode performed in such a way that the comparison circuit 112 determines the image signals as a moving image is described as the moving-image display mode.

The display control circuit 113 is a circuit which supplies an image signal selected in the selection circuit 115, the control signal (specifically, a signal for controlling switching between supply and stop of the control signal such as the start pulse SP and the clock signal CK), and the power source potential (the high power source potential $V_{dd}$, the low power source potential $V_{ss}$, and the common potential $V_{com}$) to the display panel 120 and which supplies a backlight control signal (specifically, a signal in which the backlight control circuit 131 controls on and off of a backlight) to the backlight portion 130.

Note that the image processing circuit described in this embodiment as an example may have a display-mode switching function. The display-mode switching function is a function of switching between a moving-image display mode and a still-image display mode in such a manner that a user of the liquid crystal display device selects an operation mode of the liquid crystal display device by hand or using an external connection device.

The selection circuit 115 can output the image signal to the display control circuit 113 in accordance with a signal input from a display-mode switching circuit.

For example, in the case where a mode-switching signal is input to the selection circuit 115 from the display-mode switching circuit while operation is performed in a still-image display mode, even when the comparison circuit 112 does not detect the difference of the image signals in successive frame periods, the selection circuit 115 can be operated in a mode in which image signals which are input are sequentially output to the display control circuit 113, that is, in a moving-image display mode. In the case where a mode-switching signal is input to the selection circuit 115 from the display-mode switching circuit while operation is performed in a moving-image display mode, even when the comparison circuit 112 detects the difference of the image signal in successive frame periods, the selection circuit 115 can be operated in a mode in which only an image signal of one selected frame is output, that is, in a still-image display mode. Therefore, when the liquid crystal display device of this embodiment is operated in the moving-image display mode, one image corresponding to one frame among images corresponding to a plurality of frames for time division is displayed as a still image.

The liquid crystal display device may include a photometric circuit. The liquid crystal display device provided with the photometric circuit can detect the brightness of the environment where the liquid crystal display device is put. As a result, the display control circuit 113 connected to the photometric circuit can control a driving method of a light source such as a backlight in accordance with a signal input from the photometric circuit.

For example, when the photometric circuit detects the liquid crystal display device is used in a dim environment, the display control circuit 113 controls the intensity of light from the backlight 132 to be increased so that visibility of the display screen is improved. In contrast, when the photometric circuit detects the liquid crystal display device is used under extremely bright external light (e.g., under direct sunlight outdoors), the display control circuit 113 controls the intensity of light from the backlight 132 to be lowered so that power consumption of the backlight 132 is reduced.

The backlight portion 130 includes the backlight control circuit 131 and the backlight 132. The backlight 132 may be selected and combined in accordance with the use of the liquid crystal display device 200. As a light source of the backlight 132, a cold cathode fluorescent lamp or a light-emitting diode (LED) can be used. Color display can be performed by a combination with color filters. For example, white light-emitting element (e.g., LED) can be arranged in the backlight 132. Note that the color filter is not always provided in the case where light-emitting diodes of RGB or the like are arranged in the backlight 132 and a successive additive color mixing method (a field sequential method) in which color display is performed by time division is employed. A backlight signal for controlling the backlight and the power source potential are supplied from the display control circuit 113 to the backlight control circuit 131.

In this embodiment, the display panel 120 includes the switching element 127 besides the pixel portion 122. In this embodiment, the display panel 120 includes a first substrate and a second substrate. The first substrate is provided with a driver circuit portion 121, the pixel portion 122, and the switching element 127.

Figure 3:
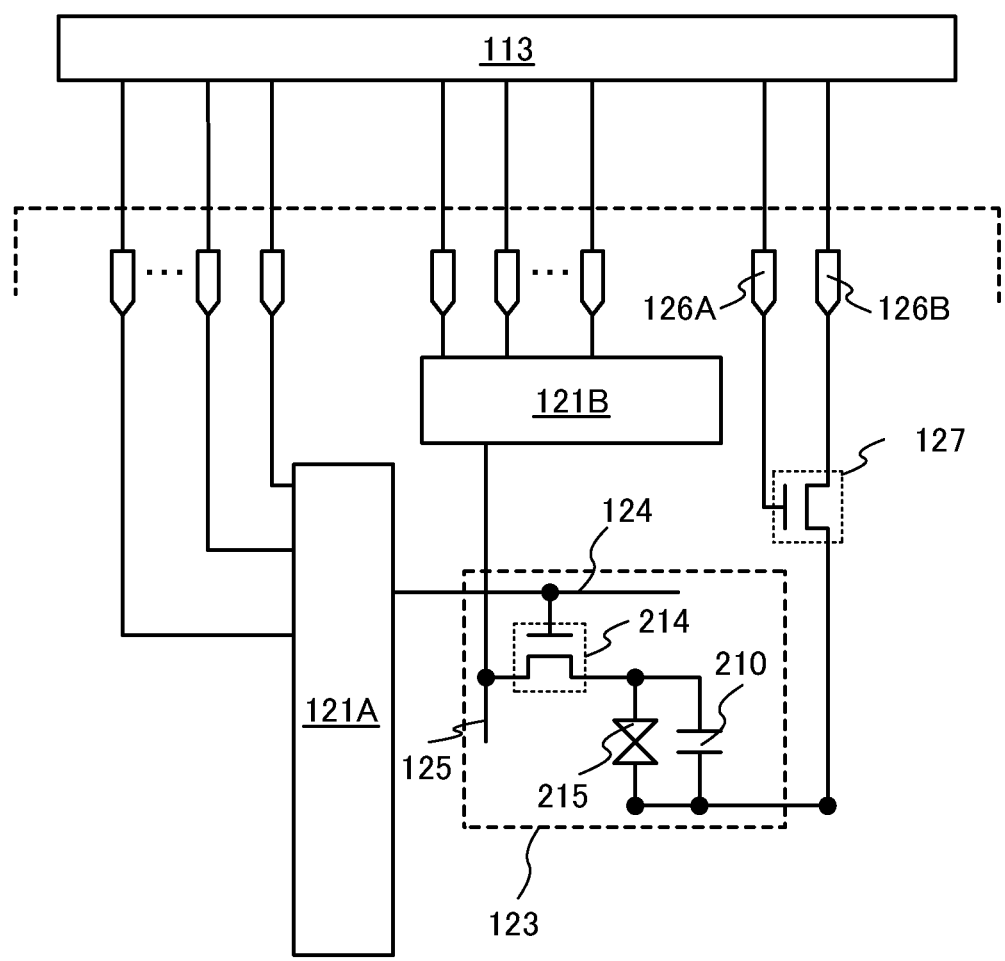
FIG. 3 is a diagram illustrating one embodiment of a liquid crystal display device.

The pixel 123 includes the transistor 214 as a switching element, a capacitor 210, and a liquid crystal element 215, which are connected to the transistor 214 (see FIG. 3).

A transistor having low off-state current is preferably used for the transistor 214. When the transistor 214 is in the off state, electric charges accumulated in the liquid crystal element 215 and the capacitor 210 which are connected to the transistor 214 having low off-state current are hardly leaked through the transistor 214, so that the state where data is written before the transistor 214 is in the off state can be maintained for long time.

In this embodiment, liquid crystals are controlled by a vertical electric field that is generated by the pixel electrode over the first substrate and the common electrode provided on the second substrate which face to the first substrate.

As an example of a liquid crystal applied to a liquid crystal element, the following can be used: a nematic liquid crystal, a cholesteric liquid crystal, a smectic liquid crystal, a discotic liquid crystal, a thermotropic liquid crystal, a lyotropic liquid crystal, a low-molecular liquid crystal, a high-molecular liquid crystal, a polymer dispersed liquid crystal (PDLC), a ferroelectric liquid crystal, an anti-ferroelectric liquid crystal, a main-chain liquid crystal, a side-chain high-molecular liquid crystal, a plasma addressed liquid crystal (PALC), a banana-shaped liquid crystal, and the like.

In addition, as a driving method of a liquid crystal, the following can be used: a TN (twisted nematic) mode, an STN (super twisted nematic) mode, an OCB (optically compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, a PNLC (polymer network liquid crystal) mode, a guest-host mode, and the like.

The switching element 127 supplies a common potential $V_{com}$ to the common electrode 128 in accordance with a control signal output from the display control circuit 113. As the switching element 127, a transistor can be used. A gate electrode and one of a source electrode and a drain electrode of the transistor may be connected to the display control circuit 113, the common potential $V_{com}$ may be supplied from the display control circuit 113 to the one of the source electrode and the drain electrode through the terminal portion 126, and the other thereof may be connected to the common electrode 128. Note that the switching element 127 may be formed over the substrate over which the driver circuit portion 121 or the pixel portion 122 is formed, or over a different substrate from them.

Since a transistor having low off-state current is used for the switching element 127, a decrease over time of the voltage applied to both terminals of the liquid crystal element 215 can be suppressed.

In the common connection portion, a terminal connected to a source electrode or a drain electrode of the switching element 127 and the common electrode 128 is electrically connected to each other.

One of the source electrode and the drain electrode of the switching element 127 for which a transistor that is one embodiment of a switching element is used is connected to one electrode of the capacitor 210 and one electrode of the liquid crystal element 215 which are not connected to the transistor 214, and the other of the source electrode and the drain electrode of the switching element 127 is connected to a terminal 126B. A gate electrode of the switching element 127 is connected to a terminal 126A.

Figure 4:
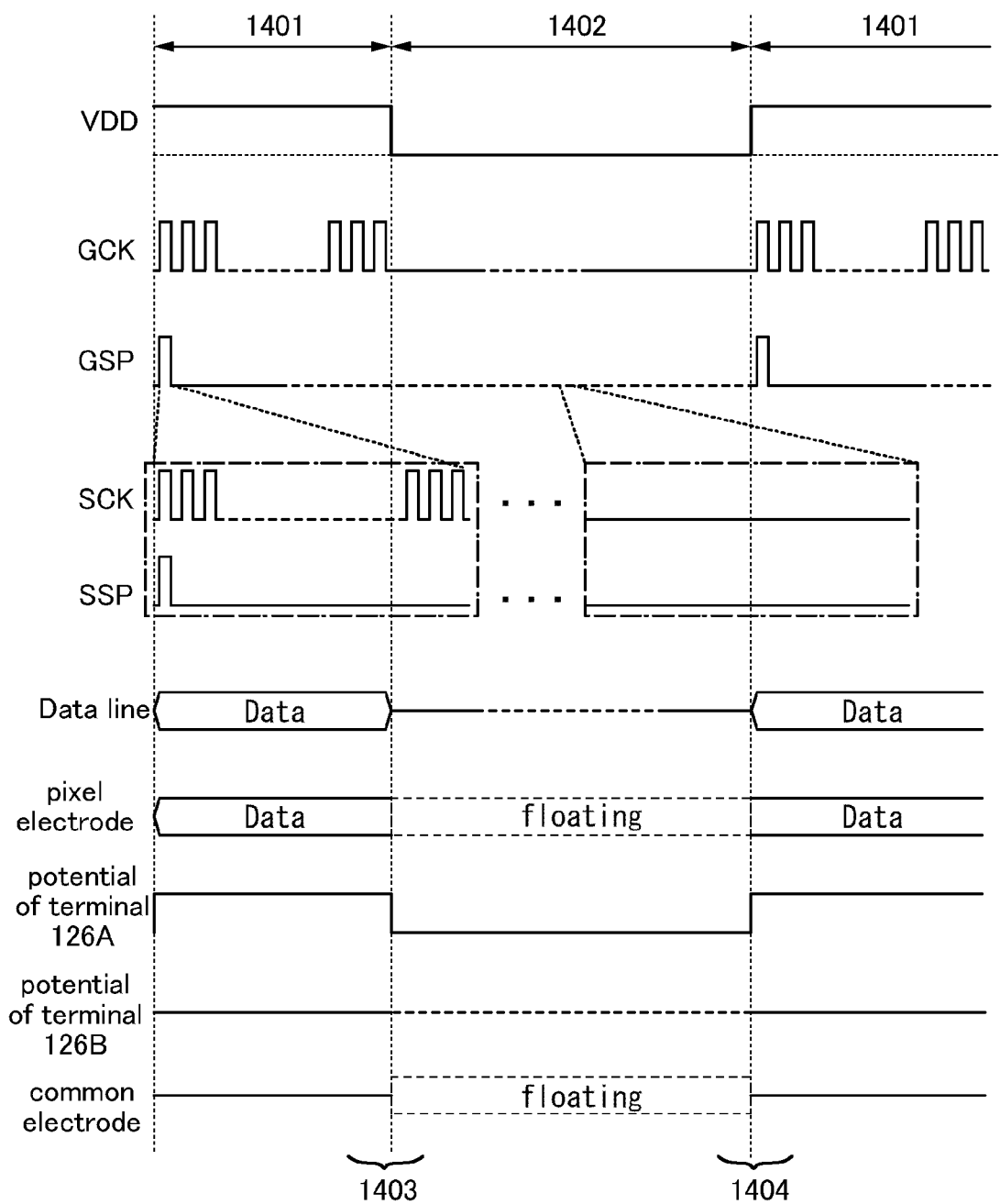
FIG. 4 is a timing chart illustrating one embodiment of a driving method of a liquid crystal display device.

Next, the state of signals supplied to the pixels will be described with reference to FIG. 3 illustrating an equivalent circuit diagram of the liquid crystal display device and FIG. 4 illustrating a timing chart.

In FIG. 4, a clock signal GCK and a start pulse GSP which are supplied from the display control circuit 113 to the gate line driver circuit 121A are illustrated. In addition, in FIG. 4, a clock signal SCK and a start pulse SSP which are supplied from the display control circuit 113 to the source line driver circuit 121B are illustrated. To describe an output timing of the clock signal, the waveform of the clock signal is indicated with simple rectangular wave in FIG. 4.

In FIG. 4, a potential of a source line (Data line) 125, a potential of a pixel electrode, a potential of the terminal 126A, a potential of the terminal 126B, and a potential of a common electrode are illustrated.

In FIG. 4, a period 1401 corresponds to a period during which image signals for displaying a moving image are written. In the period 1401, operation is performed so that the image signals and the common potential are supplied to the pixels in the pixel portion 122 and the common electrode.

A period 1402 corresponds to a period during which a still image is displayed. In the period 1402, the supply of the image signals to the pixels in the pixel portion 122 and the supply of the common potential to the common electrode are stopped. Note that each signal for stopping the operation of the driver circuit portion is supplied in the period 1402 illustrated in FIG. 4; however, it is preferable to prevent deterioration of a still image by writing image signals periodically in accordance with the length of the period 1402 and a refresh rate.

First, a timing chart in the period 1401 will be described. In the period 1401, a clock signal is supplied all the time as the clock signal GCK, and a pulse in accordance with a vertical synchronizing frequency is supplied as the start pulse GSP. In the period 1401, a clock signal is supplied all the time as the clock signal SCK, and a pulse in accordance with one gate selection period is supplied as the start pulse SSP.

An image signal Data is supplied to pixels in each row through the source line 125, and a potential of the source line 125 is supplied to the pixel electrode in accordance with a potential of a gate line 124.

A potential at which the switching element 127 is turned on is supplied from the display control circuit 113 to the terminal 126A of the switching element 127, so that a common potential is supplied to the common electrode through the terminal 126B.

On the other hand, the period 1402 is a period during which a still image is displayed. Next, a timing chart in the period 1402 is described. In the period 1402, supplies of the clock signal GCK, the start pulse GSP, the clock signal SCK, and the start pulse SSP are all stopped. In addition, the supply of the image signal Data to the source line 125 is stopped in the period 1402. In the period 1402 during which supplies of the clock signal GCK and the start pulse GSP are stopped, the transistor 214 is turned off and a potential of the pixel electrode is put in the floating state.

A potential at which the switching element 127 is turned off is supplied from the display control circuit 113 to the terminal 126A of the switching element 127, so that a potential of the common electrode is put in the floating state.

In the period 1402, both electrodes of the liquid crystal element 215, i.e., the pixel electrode and the common electrode, are put in the floating state; thus, a still image can be displayed without the supply of another potential.

The supplies of the clock signal and the start pulse to the gate line driver circuit 121A and the source line driver circuit 121B are stopped, whereby low power consumption can be achieved.

In particular, when transistors having low off-state current are used for the transistor 214 and the switching element 127, a decrease over time of the voltage applied to both terminals of the liquid crystal element 215 can be suppressed.

Figure 5A:
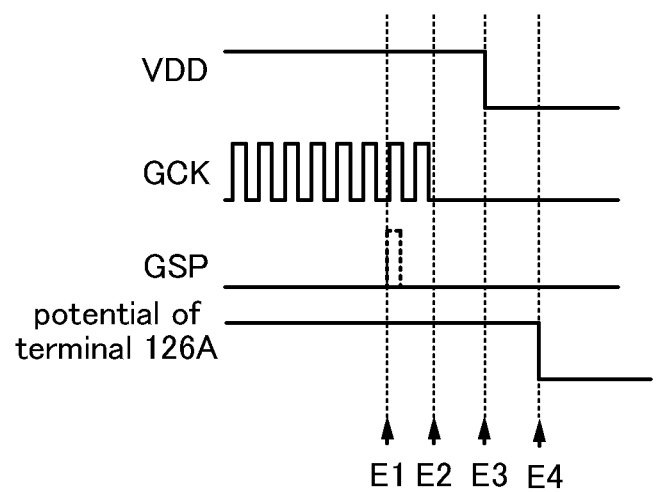
FIGS. 5A and 5B are timing charts illustrating one embodiment of a driving method of a liquid crystal display device.
Figure 5B:
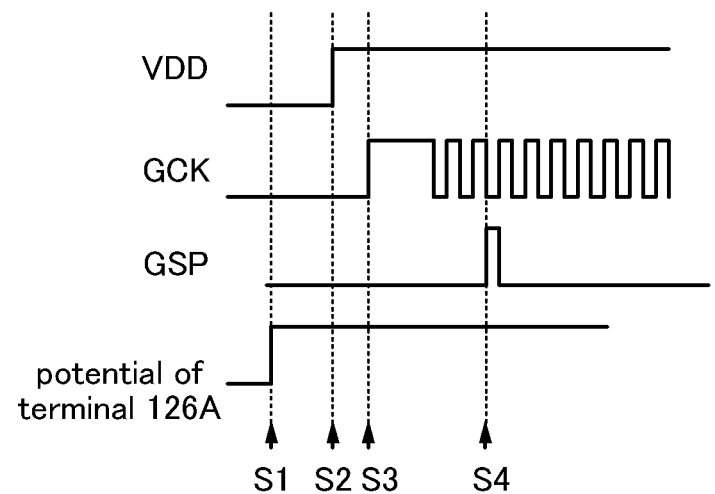

Next, operation of the display control circuit in a period during which a display image is switched from a moving image to a still image (a period 1403 in FIG. 4), and a period during which a display image is switched from a still image to a moving image (a period 1404 in FIG. 4) will be described with reference to FIGS. 5A and 5B. FIGS. 5A and 5B illustrate potentials of high power source potential $V_{dd}$, the clock signal (here, GCK), the start pulse signal (here, GSP) which are output from the display control circuit, and a potential of the terminal 126A.

FIG. 5A illustrates operation of the display control circuit in the period 1403 during which a display image is switched from a moving image to a still image. The display control circuit stops the supply of the start pulse GSP (E1 in FIG. 5A, a first step). The supply of the start pulse GSP is stopped and then, the supply of a plurality of clock signals GCK is stopped after pulse output reaches the last stage of the shift register (E2 in FIG. 5A, a second step). Then, the high power source potential $V_{dd}$ of a power source is changed to the low power source potential $V_{ss}$ (E3 in FIG. 5A, a third step). After that, the potential of the terminal 126A is changed to a potential at which the switching element 127 is turned off (E4 in FIG. 5A, a fourth step).

Through the above steps, the supply of the signals to the driver circuit portion 121 can be stopped without causing malfunction of the driver circuit portion 121. The malfunction occurred when a display image is switched from a moving image to a still image causes noise, and the noise is held as a still image; therefore, a liquid crystal display device that includes a display control circuit with fewer malfunctions can display a still image which is not deteriorated so much.

Next, operation of the display control circuit in the period 1404 during which a display image is switched from a still image to a moving image will be illustrated in FIG. 5B. The display control circuit sets a potential of the terminal 126A in a potential at which the switching element 127 is turned on (S1 in FIG. 5B, a first step). Then, a power source voltage is changed from the low power source potential $V_{ss}$ to the high power source potential $V_{dd}$ (S2 in FIG. 5B, a second step). A high-level potential is applied as the clock signal GCK, after that a plurality of clock signals GCK is supplied (S3 in FIG. 5B, a third step). Next, the start pulse signal GSP is supplied (S4 in FIG. 5B, a fourth step).

Through the above steps, the supply of drive signals to the driver circuit portion 121 can be resumed without causing malfunction of the driver circuit portion 121. Potentials of wirings are sequentially set back to those at the time of displaying a moving image, the driver circuit portion can be driven without malfunction.

Figure 6:
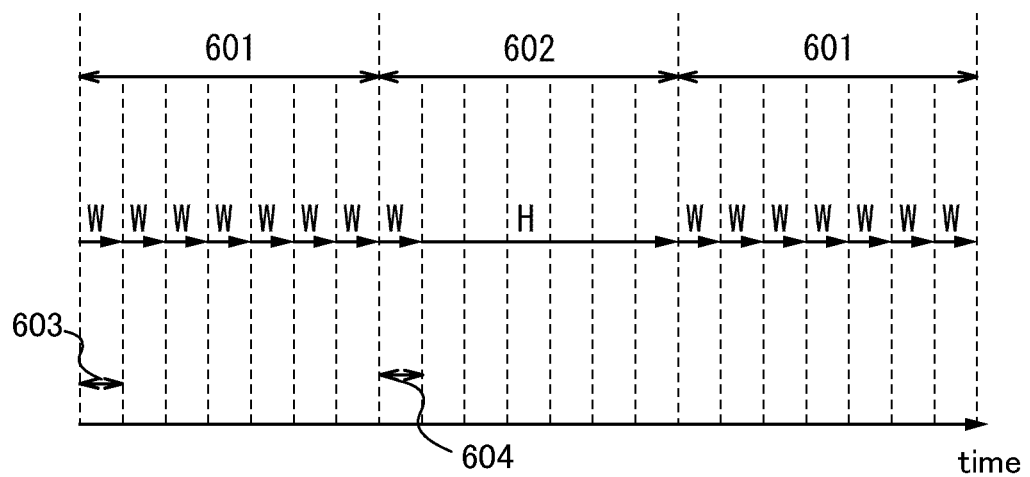
FIG. 6 is a diagram illustrating one embodiment of a driving method of a liquid crystal display device.

FIG. 6 schematically illustrates writing frequency of image signal in each frame period in a period 601 during which a moving image is displayed or in a period 602 during which a still image is displayed. In FIG. 6, "W" indicates a period during which an image signal is written, and "H" indicates a period during which the image signal is held. In addition, a period 603 is one frame period in FIG. 6; however, the period 603 may be a different period.

As described above, in the structure of the liquid crystal display device of this embodiment, an image signal of a still image displayed in the period 602 is written in the period 604, and the image signal written in the period 604 is maintained in the other period of the period 602.

The liquid crystal display device described in this embodiment as an example can decrease writing frequency of an image signal in a period during which a still image is displayed. As a result, power consumption at the time when a still image is displayed can be reduced.

In the case where a still image is displayed by rewriting the same image plural times, visible switching of the images may cause fatigue of the human eye. In the liquid crystal display device of this embodiment, writing frequency of an image signal is decreased, which makes eyestrain less severe.

In particular, in the liquid crystal display device of this embodiment, a transistor having low off-state current is applied to each pixel and a switching element for a common electrode, whereby a period (the length of time) in which a storage capacitor can maintain voltage can be extended. As a result, writing frequency of an image signal can be extremely reduced, whereby there is a significant effect in reducing power consumption and eyestrain when a still image is displayed.

In the liquid crystal display device 200 of this embodiment, after the stop unit 117 is selected, a stop signal is input and a fixed potential is written to the capacitor 210 of all the pixels. By writing the fixed potential to the capacitors 210, a potential difference between electrodes of the capacitors 210 disappears, whereby liquid crystals in a response state are switched to the initial state of the non-response state. Accordingly, an initial-state image that is displayed by the liquid crystals in the initial state is displayed on the display screen.

After the initial-state image is displayed, the power source 116 is turned off and the supply of a power source potential to the display panel 120 is stopped, whereby the liquid crystal display device 200 is turned off. Therefore, unnecessary electric field is not continuously applied to liquid crystals in the off state, whereby the liquid crystals can be in a stable initial state.

As described above, in the on state where the liquid crystal display device is turned on and electric power is supplied, the moving-image display mode or the still-image display mode is selected as appropriate in accordance with image signals in successive frames, whereby low power consumption can be achieved. Further, before the liquid crystal display device is in the off state, the fixed potential is written such that voltage is not applied to the liquid crystal element, and an initial-state image is displayed; therefore the liquid crystal element can be prevented from deteriorating, favorable image display function can be maintained for long period, and security can be improved.

Accordingly, a highly reliable liquid crystal display device in which low power consumption is achieved and a driving method of the liquid crystal display device can be provided.

Embodiment 3

In this embodiment, an example of a transistor that can be applied to a liquid crystal display device disclosed in this specification will be described. There is no particular limitation on a structure of a transistor that can be applied to the liquid crystal display device disclosed in this specification. For example, a top-gate structure or a bottom-gate structure such as a staggered type and a planar type can be used. Further, the transistor may have a single-gate structure including one channel formation region, a double-gate structure including two channel formation regions, or a triple-gate structure including three channel formation regions. Alternatively, the transistor may have a dual-gate structure including two gate electrode layers positioned over and below a channel region with a gate insulating layer provided therebetween. FIGS. 7A to 7D illustrate an example of a cross-sectional structure of a transistor. Note that transistors illustrated in FIGS. 7A to 7D are transistors including an oxide semiconductor as a semiconductor. An advantage of using an oxide semiconductor is that high mobility and low off-state current can be obtained in a relatively easy and low-temperature process; needless to say, another semiconductor may be used.

Figure 7A:
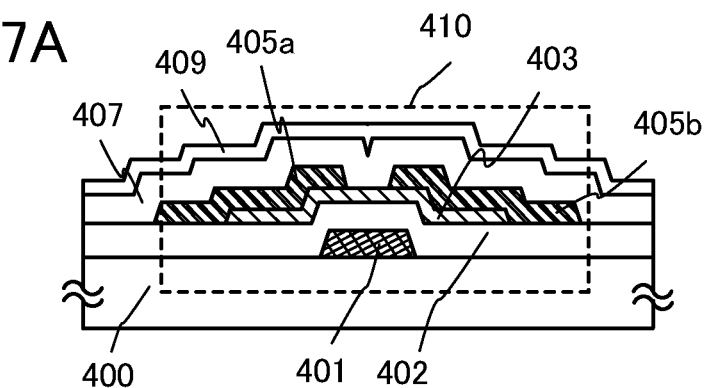
FIGS. 7A to 7D are diagrams each illustrating one embodiment of a transistor which can be applied to a liquid crystal display device.

A transistor 410 illustrated in FIG. 7A is a kind of bottom-gate thin film transistor and is also referred to as an inverted-staggered thin film transistor.

The transistor 410 includes, over a substrate 400 having an insulating surface, a gate electrode layer 401, a gate insulating layer 402, an oxide semiconductor layer 403, a source electrode layer 405a, and a drain electrode layer 405b. In addition, an insulating film 407 that covers the transistor 410 and is stacked over the oxide semiconductor layer 403 is provided. A protective insulating layer 409 is formed over the insulating film 407.

Figure 7B:
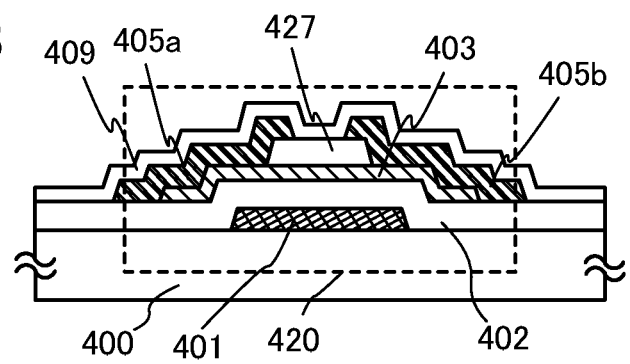

A transistor 420 illustrated in FIG. 7B is one of bottom-gate thin film transistors referred to as a channel-protective type (channel-stop type) and is also referred to as an inverted-staggered thin film transistors.

The transistor 420 includes, over the substrate 400 having an insulating surface, the gate electrode layer 401, the gate insulating layer 402, the oxide semiconductor layer 403, an insulating layer 427 that functions as a channel protective layer covering a channel formation region of the oxide semiconductor layer 403, the source electrode layer 405a, and the drain electrode layer 405b. The protective insulating layer 409 is provided to cover the transistor 420.

Figure 7C:
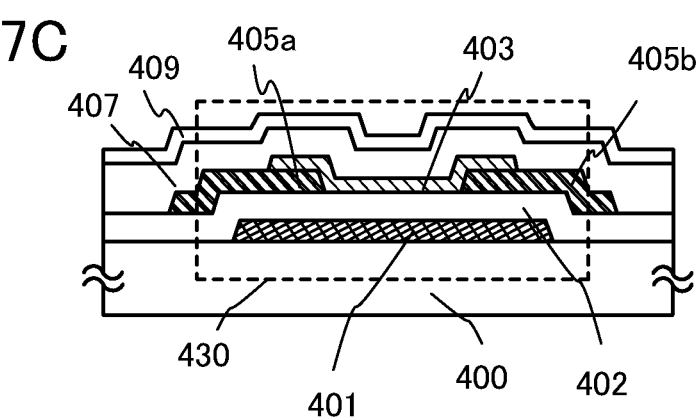

A transistor 430 illustrated in FIG. 7C is a bottom-gate thin film transistor and includes, over the substrate 400 having an insulating surface, the gate electrode layer 401, the gate insulating layer 402, the source electrode layer 405a, the drain electrode layer 405b, and the oxide semiconductor layer 403. The insulating film 407 which covers the transistor 430 and is in contact with the oxide semiconductor layer 403 is provided. The protective insulating layer 409 is formed over the insulating film 407.

In the transistor 430, the gate insulating layer 402 is provided on and in contact with the substrate 400 and the gate electrode layer 401. The source electrode layer 405a and the drain electrode layer 405b are provided on and in contact with the gate insulating layer 402. The oxide semiconductor layer 403 is provided over the gate insulating layer 402, the source electrode layer 405a, and the drain electrode layer 405b.

Figure 7D:
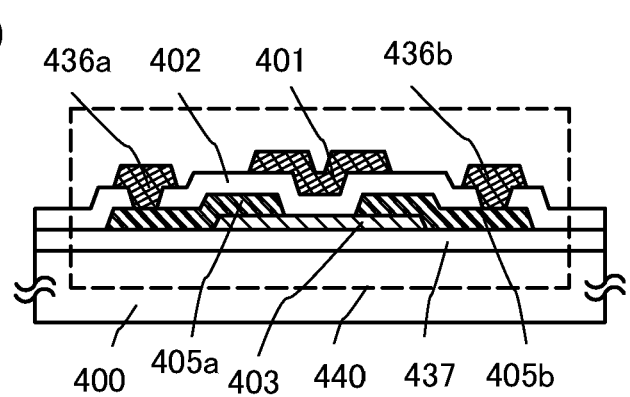

A transistor 440 illustrated in FIG. 7D is one of top-gate thin film transistors. The transistor 440 includes, over the substrate 400 having an insulating surface, an insulating layer 437, the oxide semiconductor layer 403, the source electrode layer 405a, the drain electrode layer 405b, the gate insulating layer 402, and the gate electrode layer 401. A wiring layer 436a and a wiring layer 436b are provided to be in contact with and electrically connected to the source electrode layer 405a and the drain electrode layer 405b, respectively.

In this embodiment, as described above, the oxide semiconductor layer 403 is used as a semiconductor layer. As an oxide semiconductor used for the oxide semiconductor layer 403, an In—Sn—Ga—Zn—O-based oxide semiconductor which is an oxide of four metal elements; an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, or a Sn—Al—Zn—O-based oxide semiconductor which are oxides of three metal elements; an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, or an In—Mg—O-based oxide semiconductor which are oxides of two metal elements; an In—O-based oxide semiconductor, a Sn—O-based oxide semiconductor, or a Zn—O-based oxide semiconductor can be used. Further, $SiO_2$ may be contained in the above oxide semiconductor. Here, for example, the In—Ga—Zn—O-based oxide semiconductor means an oxide containing at least In, Ga, and Zn, and the composition ratio of the elements is not particularly limited. The In—Ga—Zn—O-based oxide semiconductor may contain an element other than In, Ga, and Zn.

For the oxide semiconductor layer 403, a thin film represented by the chemical formula, $InMO_3(ZnO)_m$ (m>0), can be used. Here, M represents one or more metal elements selected from Ga, Al, Mn, and Co. For example, M can be Ga, Ga and Al, Ga and Mn, Ga and Co, or the like.

In each of the transistors 410, 420, 430, and 440 including the oxide semiconductor layer 403, a current value in an off state (an off-state current value) can be reduced. Accordingly, an electrical signal such as an image signal can be held for a longer period in the pixel, and a writing interval can be set longer in an on state. Accordingly, frequency of refresh operation can be reduced, which leads to an effect on suppressing power consumption.

Further, in the transistors 410, 420, 430, and 440 each including the oxide semiconductor layer 403, relatively high field-effect mobility can be obtained, whereby high-speed operation is possible. Therefore, by using any of the transistors in a pixel portion of a liquid crystal display device, a high-quality image can be provided. Since the transistors can be separately formed over one substrate in a circuit portion and a pixel portion, the number of components can be reduced in the liquid crystal display device.

Although there is no particular limitation on a substrate used for the substrate 400 having an insulating surface, a glass substrate of barium borosilicate glass, aluminoborosilicate glass, or the like is used.

In the bottom-gate transistors 410, 420, and 430, an insulating film serving as a base film may be provided between the substrate and the gate electrode layer. The base film has a function of preventing diffusion of an impurity element from the substrate, and can be formed to have a single-layer structure or a stacked-layer structure using one or more of a silicon nitride film, a silicon oxide film, a silicon nitride oxide film, and a silicon oxynitride film.

The gate electrode layer 401 can be formed to have a single-layer or stacked-layer structure using a metal material such as molybdenum, titanium, chromium, tantalum, tungsten, aluminum, copper, neodymium, or scandium, or an alloy material which contains any of these materials as its main component.

The gate insulating layer 402 can be formed to have a single-layer or a stacked-layer structure including a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer by a plasma CVD method, a sputtering method, or the like. For example, by a plasma CVD method, a silicon nitride layer ($SiN_y$ (y>0)) with a thickness of greater than or equal to 50 nm and less than or equal to 200 nm is formed as a first gate insulating layer, and a silicon oxide layer ($SiO_x$ (x>0)) with a thickness of greater than or equal to 5 nm and less than or equal to 300 nm is formed as a second gate insulating layer over the first gate insulating layer, so that a gate insulating layer with a total thickness of 200 nm is formed.

A conductive film used for the source electrode layer 405a and the drain electrode layer 405b can be formed using an element selected from Al, Cr, Cu, Ta, Ti, Mo, and W, an alloy film containing any of these elements, an alloy film containing a combination of any of these elements, or the like. Alternatively, a structure may be employed in which a high-melting-point metal layer of Ti, Mo, W, or the like is stacked over and/or below a metal layer of Al, Cu, or the like. In addition, heat resistance can be improved by using an Al material to which an element (Si, Nd, Sc, or the like) which prevents generation of a hillock or a whisker in an Al film is added.

A material similar to that of the source electrode layer 405a and the drain electrode layer 405b can be used for a conductive film such as the wiring layer 436a and the wiring layer 436b which are connected to the source electrode layer 405a and the drain electrode layer 405b, respectively.

Alternatively, the conductive film which serves as the source electrode layer 405a and the drain electrode layer 405b (including a wiring formed using the same layer as the source electrode layer 405a and the drain electrode layer 405b) may be formed using a conductive metal oxide. As the conductive metal oxide, indium oxide ($In_2O_3$), tin oxide ($SnO_2$), zinc oxide (ZnO), indium oxide-tin oxide alloy ($In_2O_3$—$SnO_2$, which is abbreviated to ITO), indium oxide-zinc oxide alloy ($In_2O_3$—ZnO), or any of these metal oxide materials in which silicon oxide is contained can be used.

As the insulating films 407, 427, and 437, typically, an inorganic insulating film such as a silicon oxide film, a silicon oxynitride film, an aluminum oxide film, or an aluminum oxynitride film can be used.

As the protective insulating layer 409, an inorganic insulating film such as a silicon nitride film, an aluminum nitride film, a silicon nitride oxide film, or an aluminum nitride oxide film can be used.

A planarization insulating film may be formed over the protective insulating layer 409 in order to reduce surface roughness due to the transistor. As the planarization insulating film, an organic material such as polyimide, acrylic, or benzocyclobutene can be used. Other than such organic materials, it is also possible to use a low-dielectric constant material (a low-k material) or the like. Note that the planarization insulating film may be formed by stacking a plurality of insulating films formed from these materials.

Thus, in this embodiment, by using the transistor including the oxide semiconductor layer having a low off-state current value, a liquid crystal display device with low power consumption can be provided.

Embodiment 4

In this embodiment, an example of a transistor including an oxide semiconductor layer and an example of a manufacturing method thereof are described in detail with reference to FIGS. 8A to 8E. The same portions as those in the above embodiments and portions having functions similar to those of the portions in the above embodiments and steps similar to those in the above embodiments may be handled as in the above embodiments, and repeated description is omitted. In addition, detailed description of the same portions is not repeated.

FIGS. 8A to 8E illustrate an example of a cross-sectional structure of a transistor. A transistor 510 illustrated in FIGS. 8A to 8E is a bottom-gate inverted-staggered thin film transistor which is similar to the transistor 410 illustrated in FIG. 7A.

An oxide semiconductor used for a semiconductor layer in this embodiment is an i-type (intrinsic) oxide semiconductor or a substantially i-type (intrinsic) oxide semiconductor. The i-type (intrinsic) oxide semiconductor or substantially i-type (intrinsic) oxide semiconductor is obtained in such a manner that hydrogen, which is an n-type impurity, is removed from an oxide semiconductor, and the oxide semiconductor is highly purified so as to contain as few impurities that are not main components of the oxide semiconductor as possible. In other words, a highly-purified i-type (intrinsic) semiconductor or a semiconductor close thereto is obtained not by adding impurities but by removing impurities such as hydrogen or water as much as possible. Accordingly, the oxide semiconductor layer included in the transistor 510 is an oxide semiconductor layer that is highly purified and made to be electrically i-type (intrinsic).

In addition, a highly-purified oxide semiconductor includes extremely few carriers (close to zero), and the carrier concentration thereof is less than $1×10^{14}/cm^3$, preferably less than $1×10^{12}/cm^3$, further preferably less than $1×10^{11}/cm^3$.

Since the oxide semiconductor includes extremely few carriers, an off-state current can be reduced. The smaller the amount of off-state current is, the better.

Specifically, in the thin film transistor including the oxide semiconductor layer, an off-state current density per micrometer in a channel width at room temperature can be less than or equal to 10 aA/μm ($1×10^{-17}$ A/μm), further less than or equal to 1 aA/μm ($1×10^{-18}$ A/μm), or still further less than or equal to 10 zA/μm ($1×10^{-20}$ A/μm).

When a transistor whose current value in an off state (an off-state current value) is extremely small is used as a transistor in the pixel portion of Embodiment 1, refresh operation in a still image region can be performed with a small number of times of writing image data.

In addition, in the transistor 510 including the above-described oxide semiconductor layer, the temperature dependence of on-state current is hardly observed, and the off-state current remains extremely small.

Steps of manufacturing the transistor 510 over a substrate 505 are described below with reference to FIGS. 8A to 8E.

First, a conductive film is formed over the substrate 505 having an insulating surface, and then, a gate electrode layer 511 is formed through a first photolithography step. Note that a resist mask may be formed by an inkjet method. Formation of the resist mask by an inkjet method needs no photomask; thus, manufacturing cost can be reduced.

As the substrate 505 having an insulating surface, a substrate similar to the substrate 400 described in Embodiment 3 can be used. In this embodiment, a glass substrate is used as the substrate 505.

An insulating film serving as a base film may be provided between the substrate 505 and the gate electrode layer 511. The base film has a function of preventing diffusion of an impurity element from the substrate 505, and can be formed with a single-layer structure or a stacked-layer structure using one or more of a silicon nitride film, a silicon oxide film, a silicon nitride oxide film, and a silicon oxynitride film.

In addition, the gate electrode layer 511 can be formed to have a single-layer or stacked-layer structure using a metal material such as molybdenum, titanium, chromium, tantalum, tungsten, aluminum, copper, neodymium, or scandium, or an alloy material which contains any of these materials as its main component.

Next, a gate insulating layer 507 is formed over the gate electrode layer 511. The gate insulating layer 507 can be formed to have a single-layer structure or a stacked-layer structure using a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer, by a plasma CVD method, a sputtering method, or the like.

As the oxide semiconductor layer in this embodiment, an oxide semiconductor which is made to be an i-type or substantially i-type by removing impurities is used. Such a highly-purified oxide semiconductor is extremely sensitive to an interface level or interface charge; therefore, an interface between the oxide semiconductor layer and the gate insulating layer is important. For that reason, the gate insulating layer that is to be in contact with a highly-purified oxide semiconductor needs to have high quality.

For example, a high-density plasma CVD method using microwaves (e.g., a frequency of 2.45 GHz) is preferably adopted because an insulating layer can be dense and can have high dielectric withstand voltage and high quality. When a highly-purified oxide semiconductor and a high-quality gate insulating layer are in close contact with each other, the interface level can be reduced and interface characteristics can be favorable.

Needless to say, another deposition method such as a sputtering method or a plasma CVD method can be employed as long as a high-quality insulating layer can be formed as a gate insulating layer. Moreover, it is possible to use as the gate insulating layer an insulating layer whose quality and characteristics of an interface with an oxide semiconductor are improved with heat treatment performed after the formation of the insulating layer. In any case, an insulating layer that can reduce interface level density with an oxide semiconductor to form a favorable interface, as well as having favorable film quality as the gate insulating layer, is formed.

Further, in order that hydrogen, a hydroxyl group, and moisture might be contained in the gate insulating layer 507 and an oxide semiconductor film 530 as little as possible, it is preferable that the substrate 505 over which the gate electrode layer 511 is formed or the substrate 505 over which layers up to the gate insulating layer 507 are formed be preheated in a preheating chamber of a sputtering apparatus as pretreatment for deposition of the oxide semiconductor film 530 so that impurities such as hydrogen and moisture adsorbed to the substrate 505 are eliminated and evacuation is performed. As an evacuation unit provided in the preheating chamber, a cryopump is preferable. Note that this preheating treatment can be omitted. This preheating step may be similarly performed on the substrate 505 over which components up to and including a source electrode layer 515a and a drain electrode layer 515b are formed before formation of an insulating layer 516.

Figure 8A:
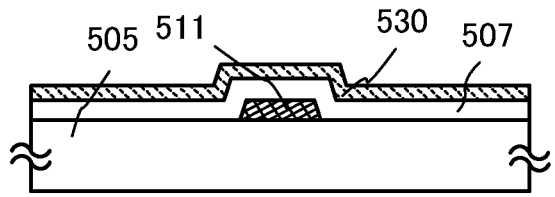
FIGS. 8A to 8E illustrate one embodiment of a method for manufacturing a transistor applicable to a liquid crystal display device.
Figure 8B:
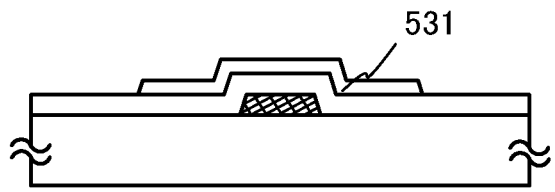

Next, the oxide semiconductor film 530 having a thickness of greater than or equal to 2 nm and less than or equal to 200 nm, preferably greater than or equal to 5 nm and less than or equal to 30 nm is formed over the gate insulating layer 507 (see FIG. 8A).

Note that before the oxide semiconductor film 530 is formed by a sputtering method, powder substances (also referred to as particles or dust) which are attached on a surface of the gate insulating layer 507 are preferably removed by reverse sputtering in which an argon gas is introduced and plasma is generated. The reverse sputtering refers to a method in which voltage is applied to a substrate side, not to a target side, using an RF power source in an argon atmosphere and plasma is generated in the vicinity of the substrate so that a substrate surface is modified. Note that instead of an argon atmosphere, a nitrogen atmosphere, a helium atmosphere, an oxygen atmosphere, or the like may be used.

As an oxide semiconductor used for the oxide semiconductor film 530, an oxide semiconductor described in Embodiment 3, such as an oxide of four metal elements, an oxide of three metal elements, an oxide of two metal elements, an In—O-based oxide semiconductor, a Sn—O-based oxide semiconductor, or a Zn—O-based oxide semiconductor can be used. Further, $SiO_2$ may be contained in the above oxide semiconductor. In this embodiment, the oxide semiconductor film 530 is deposited by a sputtering method with the use of an In—Ga—Zn—O-based oxide semiconductor target. A cross-sectional view of this stage is illustrated in FIG. 8A. Alternatively, the oxide semiconductor film 530 can be formed by a sputtering method in a rare gas (typically, argon) atmosphere, an oxygen atmosphere, or a mixed atmosphere of a rare gas and oxygen.

As a target for manufacturing the oxide semiconductor film 530 by a sputtering method, for example, a target having a composition ratio of $In_2O_3:Ga_2O_3:ZnO=1:1:1$ [molar ratio] can be used. Alternatively, a target having a composition ratio of $In_2O_3:Ga_2O_3:ZnO=1:1:2$ [molar ratio] or $In_2O_3:Ga_2O_3:ZnO=1:1:4$ [molar ratio] may be used. The fill rate of the oxide target is higher than or equal to 90% and lower than or equal to 100%, preferably, higher than or equal to 95% and lower than or equal to 99.9%. With use of the metal oxide target with high fill rate, the deposited oxide semiconductor film has high density.

It is preferable that a high-purity gas in which an impurity such as hydrogen, water, a hydroxyl group, or hydride is removed be used as the sputtering gas for the deposition of the oxide semiconductor film 530.

The substrate is placed in a deposition chamber under reduced pressure, and the substrate temperature is set to higher than or equal to 100° C. and lower than or equal to 600° C., preferably higher than or equal to 200° C. and lower than or equal to 400° C. Deposition is performed while the substrate is heated, whereby the concentration of an impurity contained in the oxide semiconductor layer formed can be reduced. In addition, damage by sputtering can be reduced. Then, a sputtering gas from which hydrogen and moisture are removed is introduced into the deposition chamber while moisture which remains therein is removed, and the oxide semiconductor film 530 is formed over the substrate 505 with the use of the above target. In order to remove the moisture that remains in the deposition chamber, an entrapment vacuum pump, for example, a cryopump, an ion pump, or a titanium sublimation pump is preferably used. The evacuation unit may be a turbo molecular pump provided with a cold trap. In the deposition chamber which is evacuated with the cryopump, for example, a compound containing a hydrogen atom, water ($H_2O$), (further preferably, also a compound containing a carbon atom), and the like are evacuated, whereby the concentration of an impurity in the oxide semiconductor film formed in the deposition chamber can be reduced.

As one example of the deposition condition, the distance between the substrate and the target is 100 mm, the pressure is 0.6 Pa, the direct-current (DC) power source is 0.5 kW, and the atmosphere is an oxygen atmosphere (the proportion of the oxygen flow rate is 100%). Note that a pulse direct-current power source is preferable because powder substances (also referred to as particles or dust) generated in deposition can be reduced and the film thickness can be uniform.

Next, the oxide semiconductor film 530 is processed into an island-shaped oxide semiconductor layer through a second photolithography step. A resist mask for forming the island-shaped oxide semiconductor layer may be formed by an inkjet method. Formation of the resist mask by an inkjet method needs no photomask; thus, manufacturing cost can be reduced.

In the case where a contact hole is formed in the gate insulating layer 507, a step of forming the contact hole can be performed at the same time as processing of the oxide semiconductor film 530.

For the etching of the oxide semiconductor film 530 here, either one or both of wet etching and dry etching may be employed. As an etchant used for wet etching of the oxide semiconductor film 530, for example, a mixed solution of phosphoric acid, acetic acid, and nitric acid, or the like can be used. Alternatively, ITO07N (produced by KANTO CHEMICAL CO., INC.) may be used.

Next, first heat treatment is performed on the oxide semiconductor layer. The oxide semiconductor layer can be dehydrated or dehydrogenated by this first heat treatment. The temperature of the first heat treatment is higher than or equal to 400° C. and lower than or equal to 750° C., or higher than or equal to 400° C. and lower than the strain point of the substrate. Here, the substrate is put in an electric furnace which is a kind of heat treatment apparatus and heat treatment is performed on the oxide semiconductor layer at 450° C. for one hour in a nitrogen atmosphere, and then, water or hydrogen is prevented from entering the oxide semiconductor layer without exposure to the air; thus, an oxide semiconductor layer 531 is obtained (see FIG. 8B).

Note that a heat treatment apparatus is not limited to an electrical furnace, and an apparatus for heating an object to be treated by heat conduction or heat radiation from a heating element such as a resistance heating element may be used. For example, a rapid thermal anneal (RTA) apparatus such as a gas rapid thermal anneal (GRTA) apparatus or a lamp rapid thermal anneal (LRTA) apparatus can be used. An LRTA apparatus is an apparatus for heating an object to be treated by radiation of light (an electromagnetic wave) emitted from a lamp such as a halogen lamp, a metal halide lamp, a xenon arc lamp, a carbon arc lamp, a high-pressure sodium lamp, or a high-pressure mercury lamp. A GRTA apparatus is an apparatus for heat treatment using a high-temperature gas. As the high-temperature gas, an inert gas that does not react with an object to be treated by heat treatment, such as nitrogen or a rare gas like argon, is used.

For example, as the first heat treatment, GRTA in which the substrate is moved into an inert gas heated to a high temperature higher than or equal to 650° C. and lower than or equal to 700° C., heated for several minutes, and moved out of the inert gas heated to the high temperature may be performed.

Note that in the first heat treatment, it is preferable that water, hydrogen, and the like be not contained in the nitrogen or a rare gas such as helium, neon, or argon. It is preferable that the purity of nitrogen or the rare gas such as helium, neon, or argon which is introduced into a heat treatment apparatus be set to be 6N (99.9999%) or higher, preferably 7N (99.99999%) or higher (that is, the concentration of impurities is 1 ppm or lower, preferably 0.1 ppm or lower).

Further, after the oxide semiconductor layer is heated in the first heat treatment, a high-purity oxygen gas, a high-purity $N_2O$ gas, or an ultra-dry air (the dew point is lower than or equal to −40° C., preferably lower than or equal to −60° C.) may be introduced into the same furnace. It is preferable that water, hydrogen, and the like be not contained in an oxygen gas or an $N_2O$ gas. The purity of the oxygen gas or the $N_2O$ gas that is introduced into the heat treatment apparatus is preferably greater than or equal to 6N, more preferably greater than or equal to 7N (i.e., the concentration of impurities in the oxygen gas or the $N_2O$ gas is preferably less than or equal to 1 ppm, more preferably less than or equal to 0.1 ppm). By the action of the oxygen gas or the $N_2O$ gas, oxygen which has been reduced at the same time as the step for removing impurities by dehydration or dehydrogenation is supplied, so that the oxide semiconductor layer can be a highly-purified and electrically i-type (intrinsic) oxide semiconductor.

In addition, the first heat treatment of the oxide semiconductor layer can also be performed on the oxide semiconductor film 530 that has not yet been processed into the island-shaped oxide semiconductor layer. In that case, the substrate is taken out from the heat apparatus after the first heat treatment, and then a photolithography step is performed.

Note that the first heat treatment may be performed at any of the following timings in addition to the above timing as long as it is performed after deposition of the oxide semiconductor layer: after a source electrode layer and a drain electrode layer are formed over the oxide semiconductor layer and after an insulating layer is formed over the source electrode layer and the drain electrode layer.

Further, the step of forming the contact hole in the gate insulating layer 507 may be performed either before or after the first heat treatment is performed on the semiconductor film 530.

In addition, as the oxide semiconductor layer, an oxide semiconductor layer having a crystal region with a large thickness (a single crystal region), that is, a crystal region which is c-axis-aligned perpendicularly to a surface of the film may be formed by performing deposition twice and heat treatment twice, even when any of an oxide, a nitride, a metal, or the like is used for a material of a base component. For example, a first oxide semiconductor film with a thickness greater than or equal to 3 nm and less than or equal to 15 nm is deposited, and first heat treatment is performed in a nitrogen, an oxygen, a rare gas, or a dry air atmosphere at a temperature higher than or equal to 450° C. and lower than or equal to 850° C. or preferably higher than or equal to 550° C. and lower than or equal to 750° C., so that a first oxide semiconductor film having a crystal region (including a plate-like crystal) in a region including a surface is formed. Then, a second oxide semiconductor film which has a larger thickness than the first oxide semiconductor film is formed, and second heat treatment is performed at a temperature higher than or equal to 450° C. and lower than or equal to 850° C. or preferably higher than or equal to 600° C. and lower than or equal to 700° C., so that crystal growth proceeds upward with the use of the first oxide semiconductor film as a seed of the crystal growth and the whole second oxide semiconductor film is crystallized. In such a manner, the oxide semiconductor layer having a crystal region having a large thickness may be formed.

Next, a conductive film serving as the source electrode layer 515a and the drain electrode layer 515b (including a wiring formed in the same layer as the source electrode layer 515a and the drain electrode layer 515b) is formed over the gate insulating layer 507 and the oxide semiconductor layer 531. As the conductive film serving as the source electrode layer 515a and the drain electrode layer 515b, the material used for the source electrode layer 405a and the drain electrode layer 405b which is described in Embodiment 3 can be used.

Figure 8C:
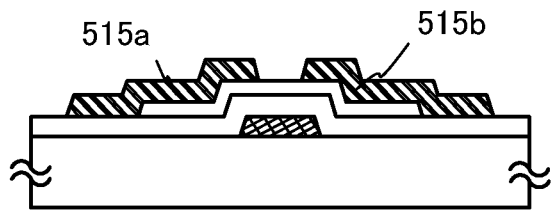

A resist mask is formed over the conductive film through a third photolithography step, and the source electrode layer 515a and the drain electrode layer 515b are formed by selective etching, and then, the resist mask is removed (see FIG. 8C).

Light exposure at the time of the formation of the resist mask in the third photolithography step may be performed using ultraviolet light, KrF laser light, or ArF laser light. A channel length L of a transistor that is completed later is determined by a distance between bottom end portions of the source electrode layer and the drain electrode layer, which are adjacent to each other over the oxide semiconductor layer 531. In the case where light exposure is performed for a channel length L of less than 25 nm, the light exposure at the time of the formation of the resist mask in the third photolithography step may be performed using extreme ultraviolet having an extremely short wavelength of several nanometers to several tens of nanometers. Light exposure with extreme ultraviolet leads to a high resolution and a large depth of focus. Thus, the channel length L of the transistor that is completed later can be greater than or equal to 10 nm and less than or equal to 1000 nm and the operation speed of a circuit can be increased.

In order to reduce the number of photomasks used in a photolithography step and reduce the number of photolithography steps, an etching step may be performed with the use of a multi-tone mask that is a light-exposure mask through which light is transmitted to have various intensities. A resist mask formed with the use of a multi-tone mask has various thicknesses and further can be changed in shape by etching; therefore, the resist mask can be used in a plurality of etching steps for processing into different patterns. Therefore, a resist mask corresponding to at least two kinds or more of different patterns can be formed by one multi-tone mask. Thus, the number of light-exposure masks can be reduced and the number of corresponding photolithography steps can be also reduced, whereby simplification of a process can be realized.

Note that it is preferable that etching conditions be optimized so as not to etch and divide the oxide semiconductor layer 531 when the conductive film is etched. However, it is difficult to obtain etching conditions in which only the conductive film is etched and the oxide semiconductor layer 531 is not etched at all. In some cases, only part of the oxide semiconductor layer 531 is etched when the conductive film is etched, whereby the oxide semiconductor layer 531 having a groove portion (a recessed portion) is formed.

In this embodiment, since the Ti film is used as the conductive film and the In—Ga—Zn—O-based oxide semiconductor is used as the oxide semiconductor layer 531, ammonia hydrogen peroxide (a mixed solution of ammonia, water, and hydrogen peroxide) is used as an etchant for etching the conductive film.

Next, by plasma treatment using a gas such as $N_2O$, $N_2$, or Ar, water or the like adsorbed to a surface of an exposed portion of the oxide semiconductor layer may be removed. In the case where the plasma treatment is performed, the insulating layer 516 is formed without exposure to the air as a protective insulating film in contact with part of the oxide semiconductor layer.

The insulating layer 516 can be formed to a thickness of at least 1 nm by a method by which an impurity such as water or hydrogen does not enter the insulating layer 516, such as a sputtering method as appropriate. When hydrogen is contained in the insulating layer 516, entry of the hydrogen to the oxide semiconductor layer, or extraction of oxygen in the oxide semiconductor layer by the hydrogen may occur, thereby causing the backchannel of the oxide semiconductor layer to have lower resistance (to be n-type), so that a parasitic channel may be formed. Therefore, it is important that a deposition method in which hydrogen is not used is employed in order to form the insulating layer 516 containing as little hydrogen as possible.

In this embodiment, a silicon oxide film is formed to a thickness of 200 nm as the insulating layer 516 with a sputtering method. The substrate temperature in deposition may be higher than or equal to room temperature and lower than or equal to 300° C. and in this embodiment, is 100° C. The silicon oxide film can be deposited by a sputtering method in a rare gas (typically, argon) atmosphere, an oxygen atmosphere, or a mixed atmosphere containing a rare gas and oxygen. As a target, a silicon oxide target or a silicon target may be used. For example, the silicon oxide film can be formed using a silicon target by a sputtering method in an atmosphere containing oxygen. As the insulating layer 516 that is formed in contact with the oxide semiconductor layer, an inorganic insulating film which does not include impurities such as moisture, a hydrogen ion, and $OH^-$ and blocks entry of these from the outside is used. Typically, a silicon oxide film, a silicon oxynitride film, an aluminum oxide film, an aluminum oxynitride film, or the like is used.

In order to remove residual moisture in the deposition chamber of the insulating layer 516 at the same time as deposition of the oxide semiconductor film 530, an entrapment vacuum pump (such as a cryopump) is preferably used. When the insulating layer 516 is deposited in the deposition chamber evacuated using a cryopump, the impurity concentration in the insulating layer 516 can be reduced. In addition, as an evacuation unit for removing the residual moisture in the deposition chamber of the insulating layer 516, a turbo molecular pump provided with a cold trap may be used.

It is preferable that a high-purity gas in which an impurity such as hydrogen, water, a hydroxyl group, or hydride is removed be used as the sputtering gas for the deposition of the insulating layer 516.

Next, second heat treatment is performed in an inert gas atmosphere or oxygen gas atmosphere (preferably at a temperature higher than or equal to 200 and lower than or equal to 400° C., for example, higher than or equal to 250 and lower than or equal to 350° C.). For example, the second heat treatment is performed in a nitrogen atmosphere at 250° C. for one hour. In the second heat treatment, part of the oxide semiconductor layer (a channel formation region) is heated while being in contact with the insulating layer 516.

Through the above process, the first heat treatment is performed on the oxide semiconductor film so that an impurity such as hydrogen, moisture, a hydroxyl group, or hydride (also referred to as a hydrogen compound) is intentionally removed from the oxide semiconductor layer. Additionally, oxygen that is one of main components of an oxide semiconductor and is simultaneously reduced in a step of removing an impurity can be supplied. Accordingly, the oxide semiconductor layer is highly purified to be an electrically i-type (intrinsic) semiconductor.

Figure 8D:
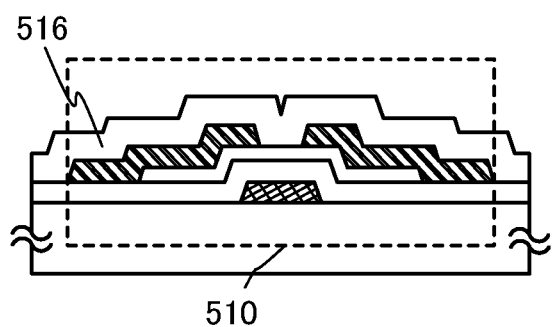
Figure 8E:
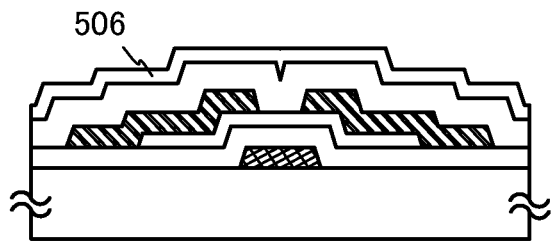

Through the above process, the transistor 510 is formed (FIG. 8D).

When a silicon oxide layer having a lot of defects is used as the insulating layer 516, heat treatment after formation of the silicon oxide layer has an effect in diffusing an impurity such as hydrogen, moisture, a hydroxyl group, or hydride contained in the oxide semiconductor layer to the oxide insulating layer so that the impurity contained in the oxide semiconductor layer can be further reduced.

A protective insulating layer 506 may be formed over the insulating layer 516. For example, a silicon nitride film is formed by an RF sputtering method. Since an RF sputtering method has high productivity, it is preferably used as a deposition method of the protective insulating layer. As the protective insulating layer, an inorganic insulating film that does not include an impurity such as moisture and prevents entry of these from the outside, such as a silicon nitride film or an aluminum nitride film is used. In this embodiment, the protective insulating layer 506 is formed using a silicon nitride film (see FIG. 8E).

In this embodiment, as the protective insulating layer 506, a silicon nitride film is formed by heating the substrate 505 over which layers up to the insulating layer 516 are formed, to a temperature higher than or equal to 100° C. and lower than or equal to 400° C., introducing a sputtering gas containing high-purity nitrogen from which hydrogen and moisture are removed, and using a target of silicon semiconductor. In this case, the protective insulating layer 506 is preferably deposited removing moisture remaining in a treatment chamber, similarly to the insulating layer 516.

After the formation of the protective insulating layer 506, heat treatment may be further performed at a temperature of a temperature higher than or equal to 100° C. and lower than or equal to 200° C. in the air for longer than or equal to 1 hour and shorter than or equal to 30 hours. This heat treatment may be performed at a fixed heating temperature. Alternatively, the following change in the heating temperature may be conducted plural times repeatedly: the heating temperature is increased from a room temperature to a temperature higher than or equal to 100° C. and lower than or equal to 200° C. and then decreased to a room temperature.

In this manner, with the use of the transistor including a highly-purified oxide semiconductor layer manufactured using this embodiment, the current value in the off-state (an off-state current value) can be further reduced. Accordingly, an electric signal such as image data can be held for a longer period and a writing interval can be set longer. Therefore, the frequency of refresh operation can be reduced, which leads to a higher effect of suppressing power consumption.

In addition, since the transistor described in this embodiment has high field-effect mobility, high-speed operation is possible. Accordingly, by using the transistor in a pixel portion of a liquid crystal display device, a high-quality image can be provided. In addition, since the transistor can be separately formed in a driver circuit and a pixel portion over one substrate, the number of components of the liquid crystal display device can be reduced.

This embodiment can be implemented combining with any of the other embodiments as appropriate.

Embodiment 5

A liquid crystal display device disclosed in this specification can be applied to a variety of electronic devices (including game machines). Examples of electronic devices are a television set (also referred to as a television or a television receiver), a monitor of a computer or the like, a camera such as a digital camera or a digital video camera, a digital photo frame, a mobile phone handset (also referred to as a mobile phone or a mobile phone device), a portable game machine, a portable information terminal, an audio reproducing device, a large-sized game machine such as a pachinko machine, and the like. In this embodiment, examples of electronic devices including any of the liquid crystal display devices of the embodiments described above will be described.

Figure 9A:
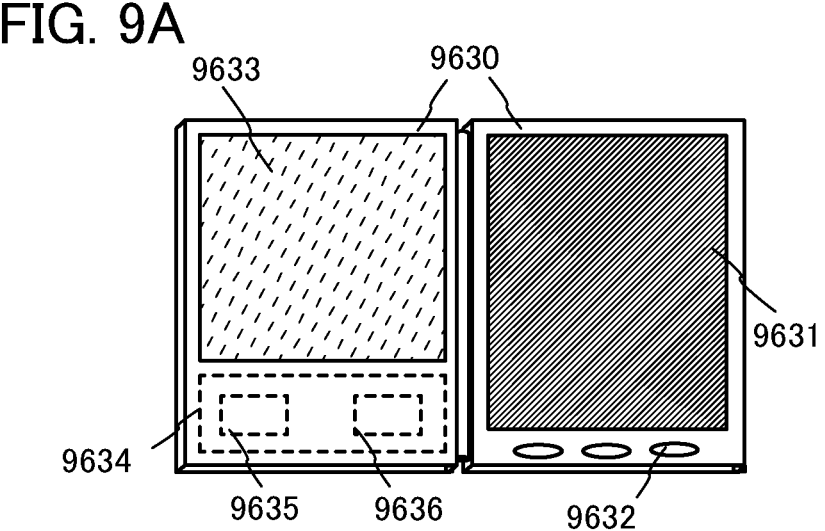
FIGS. 9A and 9B are a block diagram and a diagram illustrating one embodiment of a liquid crystal display device.

FIG. 9A illustrates an electronic book reader (also referred to as an e-book reader) which can include housings 9630, a display portion 9631, operation keys 9632, a solar battery 9633, and a charge and discharge control circuit 9634. The electronic book reader illustrated in FIG. 9A can have various functions such as a function of displaying various kinds of information (e.g., a still image, a moving image, and a text image); a function of displaying a calendar, a date, a time, and the like on the display portion; a function of operating or editing the information displayed on the display portion; and a function of controlling processing by various kinds of software (programs). Note that in FIG. 9A, a structure including a battery 9635 and a DCDC converter 9636 (hereinafter abbreviated as a converter 9636) is illustrated as an example of the charge and discharge control circuit 9634. By applying the liquid crystal display device described in any of Embodiments 1 to 4 to the display portion 9631, an electronic book reader which is capable of maintaining favorable display images for longer time, with high security and low power consumption can be provided.

In the case where a semi-transmissive liquid crystal display device or a reflective liquid crystal display device be used as the display portion 9631, use under a relatively bright condition is assumed; therefore, the structure illustrated in FIG. 9A is preferable because power generation by the solar battery 9633 and charge in the battery 9635 are effectively performed. Note that the solar battery 9633 can be provided on a space of the housing 9630 (a surface and a rear surface) as appropriate; therefore charge of the battery 9635 is efficiently performed. When a lithium ion battery is used as the battery 9635, there is an advantage of downsizing or the like.

Figure 9B:
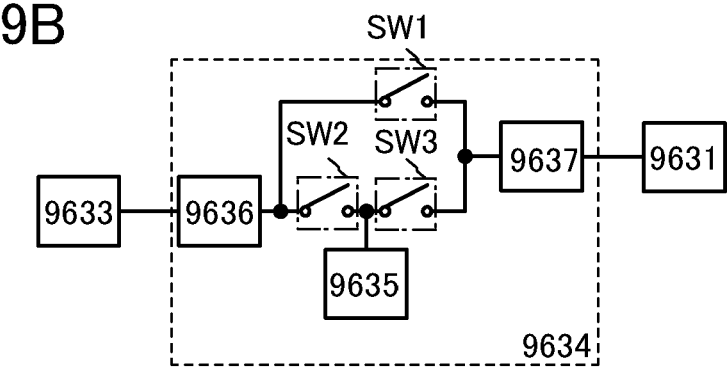

The structure and the operation of the charge and discharge control circuit 9634 illustrated in FIG. 9A will be described with reference to a block diagram in FIG. 9B. The solar battery 9633, the battery 9635, the converter 9636, a converter 9637, switches SW1 to SW3, and the display portion 9631 are illustrated in FIG. 9B, and the battery 9635, the converter 9636, the converter 9637, and the switches SW1 to SW3 correspond to the charge and discharge control circuit 9634.

First, an example of operation in the case where power is generated by the solar battery 9633 utilizing external light is described. The voltage of electric power generated by the solar battery is raised or lowered by the converter 9636 to be a voltage for charging the battery 9635. Then, when the electric power from the solar battery 9633 is used for the operation of the display portion 9631, the switch SW1 is turned on and the voltage of the electric power is raised or lowered by the converter 9637 so as to be a voltage needed for the display portion 9631. In addition, when display on the display portion 9631 is not performed, the switch SW1 is turned off and the switch SW2 is turned on so that charge of the battery 9635 may be performed.

Next, operation in the case where power is not generated by the solar battery 9633 utilizing external light is described. The voltage of electric power accumulated in the battery 9635 is raised or lowered by the converter 9637 by turning on the switch SW3. Then, electric power from the battery 9635 is used for the operation of the display portion 9631.

Note that although the solar battery 9633 is described as an example of means for charge, charge of the battery 9635 may be performed with another means. In addition, a combination of the solar battery 9633 and another means for charge may be used.

Figure 10A:
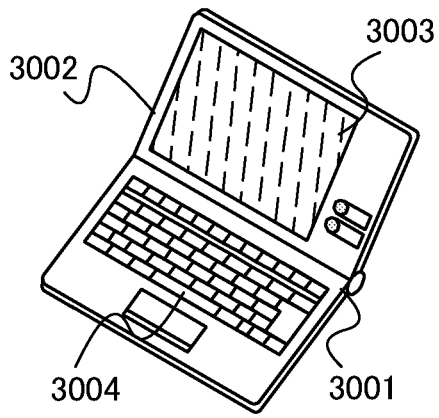
FIGS. 10A to 10F are diagrams illustrating an electronic device.

FIG. 10A illustrates a laptop personal computer, which includes a main body 3001, a housing 3002, a display portion 3003, a keyboard 3004, and the like. By applying the liquid crystal display device described in any of Embodiments 1 to 4 to the display portion 3003, a laptop personal computer capable of maintaining favorable display images for longer time, with high security and low power consumption can be provided.

Figure 10B:
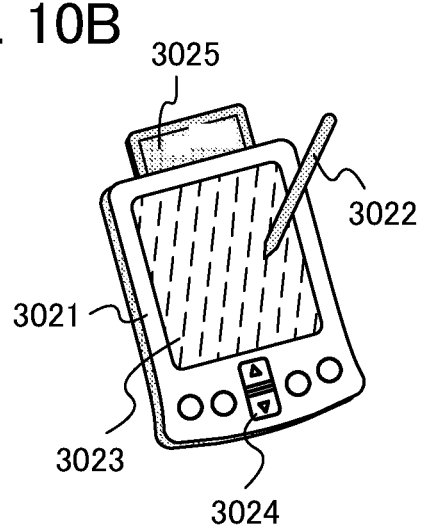

FIG. 10B is a portable information terminal (PDA) which includes a display portion 3023, an external interface 3025, an operation button 3024, and the like in a main body 3021. In addition, a stylus 3022 is included as an accessory for operation. By applying the liquid crystal display device described in any of Embodiments 1 to 4 to the display portion 3023, a portable information terminal (PDA) in which convenience and security is improved and power consumption is reduced can be provided.

Figure 10C:
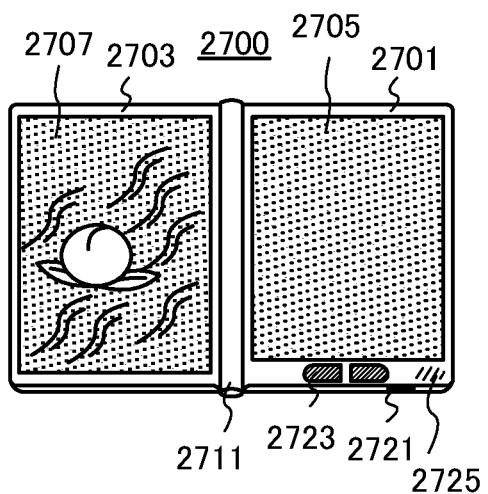

FIG. 10C illustrates an example of an electronic book reader. For example, the electronic book reader 2700 includes two housings, a housing 2701 and a housing 2703. The housing 2701 and the housing 2703 are combined with a hinge 2711 so that the electronic book reader 2700 can be opened and closed with the hinge 2711 as an axis. With such a structure, the electronic book reader 2700 can operate like a paper book.

A display portion 2705 and a display portion 2707 are incorporated in the housing 2701 and the housing 2703, respectively. The display portion 2705 and the display portion 2707 may display one image or different images. In the case where the display portion 2705 and the display portion 2707 display different images, for example, text can be displayed on a display portion on the right side (the display portion 2705 in FIG. 10C) and graphics can be displayed on a display portion on the left side (the display portion 2707 in FIG. 10C). By applying the liquid crystal display device described in any of Embodiments 1 to 4 to the display portion 2705 and the display portion 2707, a laptop personal computer capable of maintaining favorable display images for longer time, with high security and low power consumption can be provided.

FIG. 10C illustrates an example in which the housing 2701 is provided with an operation portion and the like. For example, the housing 2701 is provided with a power switch 2721, operation keys 2723, a speaker 2725, and the like. With the operation key 2723, pages can be turned. Note that a keyboard, a pointing device, or the like may also be provided on the surface of the housing, on which the display portion is provided. Furthermore, an external connection terminal (an earphone terminal, a USB terminal, or the like), a recording medium insertion portion, and the like may be provided on the back surface or the side surface of the housing. Moreover, the electronic book reader 2700 may have a function of an electronic dictionary.

The electronic book reader 2700 may have a configuration capable of wirelessly transmitting and receiving data. Through wireless communication, desired book data or the like can be purchased and downloaded from an electronic book server.

Figure 10D:
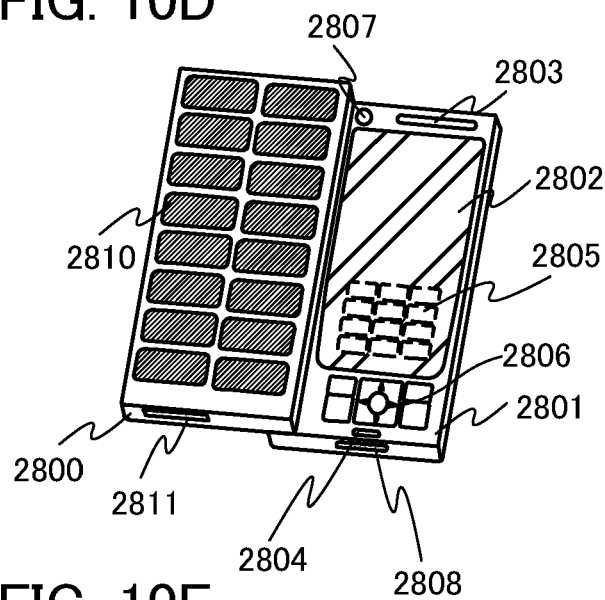

FIG. 10D illustrates a mobile phone, which includes two housings, a housing 2800 and a housing 2801. The housing 2801 includes a display panel 2802, a speaker 2803, a microphone 2804, a pointing device 2806, a camera lens 2807, an external connection terminal 2808, and the like. In addition, the housing 2800 includes a solar cell 2810 having a function of charge of the portable information terminal, an external memory slot 2811, and the like. Further, an antenna is incorporated in the housing 2801. By applying the liquid crystal display device described in any of Embodiments 1 to 4 to the display panel 2802, a mobile phone capable of maintaining favorable display images for longer time, with high security and low power consumption can be provided.

Further, the display panel 2802 is provided with a touch panel. A plurality of operation keys 2805 which are displayed as images is illustrated by dashed lines in FIG. 10D. Note that a boosting circuit by which a voltage output from the solar cell 2810 is increased to be sufficiently high for each circuit is also included.

In the display panel 2802, the display direction can be appropriately changed depending on a usage pattern. Further, the display device is provided with the camera lens 2807 on the same surface as the display panel 2802, and thus it can be used as a video phone. The speaker 2803 and the microphone 2804 can be used for videophone calls, recording and playing sound, and the like as well as voice calls. Moreover, the housings 2800 and 2801 in a state where they are opened as illustrated in FIG. 10D can be slid so that one is lapped over the other; therefore, the size of the mobile phone can be reduced, which makes the mobile phone suitable for being carried.

The external connection terminal 2808 can be connected to an AC adapter and various types of cables such as a USB cable, and charging and data communication with a personal computer are possible. Moreover, a large amount of data can be stored by inserting a storage medium into the external memory slot 2811 and can be moved.

Further, in addition to the above functions, an infrared communication function, a television reception function, or the like may be provided.

Figure 10E:
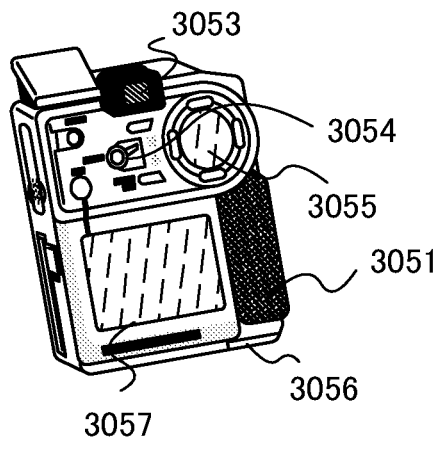

FIG. 10E illustrates a digital video camera which includes a main body 3051, a display portion A 3057, an eyepiece 3053, an operation switch 3054, a display portion B 3055, a battery 3056, and the like. By applying the liquid crystal display device described in any of Embodiments 1 to 4 to the display portion A 3057 and the display portion B 3055, a digital video camera capable of maintaining favorable display images for longer time, with high security and low power consumption can be provided.

Figure 10F:
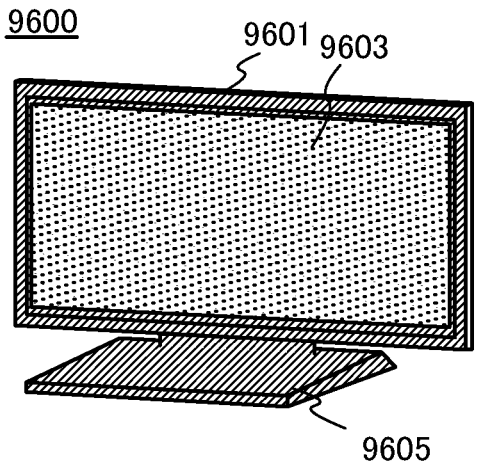

FIG. 10F illustrates an example of a television set. In the television set 9600, a display portion 9603 is incorporated in a housing 9601. The display portion 9603 can display images. Here, the housing 9601 is supported by a stand 9605. By applying the liquid crystal display device described in any of Embodiments 1 to 4 to the display portion 9603, the television set capable of maintaining favorable display images for longer time, with high security and low power consumption can provided.

The television set 9600 can be operated by an operation switch of the housing 9601 or a separate remote controller. Further, the remote controller may be provided with a display portion for displaying data output from the remote controller.

Note that the television set 9600 is provided with a receiver, a modem, and the like. With the use of the receiver, general television broadcasting can be received. Moreover, when the display device is connected to a communication network with or without wires via the modem, one-way (from a sender to a receiver) or two-way (between a sender and a receiver or between receivers) information communication can be performed.

This embodiment can be implemented in appropriate combination with the structures described in the other embodiments.

EXAMPLE 1

In this example, results obtained by comparing display states between following liquid crystal display devices are described: a liquid crystal display device in which an initial-state image is displayed before the liquid crystal display device is turned off: and a liquid crystal display device in which an image before the liquid crystal display device is in an off state is being displayed when the liquid crystal display device is turned off as a comparative example.

Figure 12A:
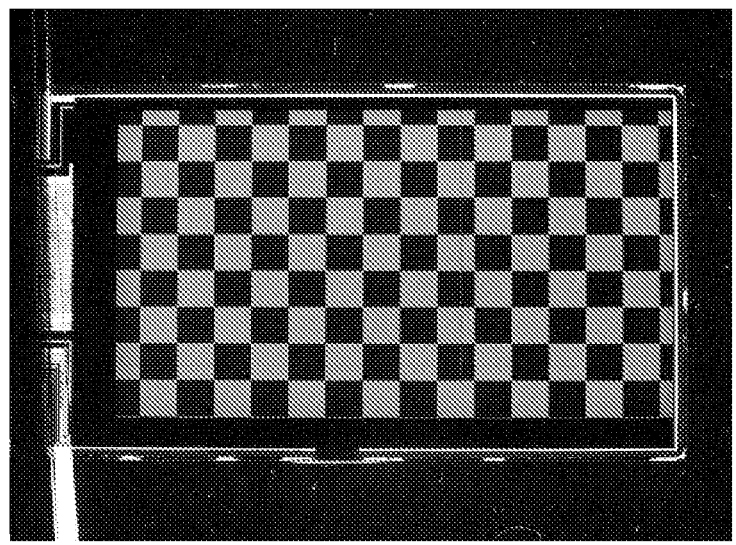
FIGS. 12A and 12B are pictures of display images of a liquid crystal display device.
Figure 13A:
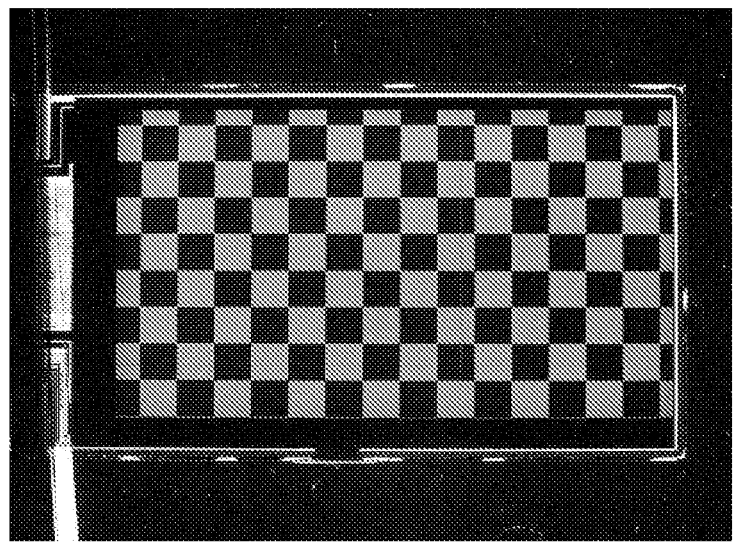
FIGS. 13A and 13B are pictures of display images of a liquid crystal display device.

FIG. 12A and FIG. 13A (FIG. 12A and FIG. 13A are the same pictures) are pictures of a display screen on which an on-state image before the liquid crystal display device is in the off state is displayed. Images in FIG. 12A and FIG. 13A are checkered pattern of black and white. As a switching element of a pixel, a transistor including an oxide semiconductor layer (In—Ga—Zn—O layer) having low off-state current was employed. The liquid crystal display device of this example is a transmissive liquid crystal display device, in which light is supplied from a backlight. In this example, after the liquid crystal display device was turned off to stop the supply of a power source potential to a display panel including a driver circuit portion and a pixel portion, the backlight remains on so that the display state of the screen could be recognized. Since the liquid crystal display device of this example is a normally-white liquid crystal display device, a display in which liquid crystals are in an initial state is white by transmitting light from the backlight.

Figure 12B:
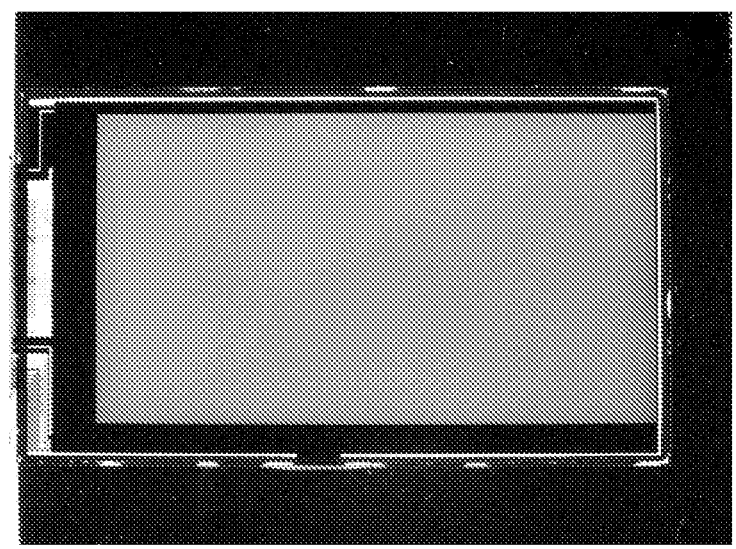

In FIG. 12B, a display screen just after the display device is turned off in the case where a fixed potential is written to the capacitor to return the liquid crystal to the initial state before the display device is turned off, and then the supply of the power source potential to the display panel including the driver circuit portion and the pixel portion is stopped is illustrated. On the display screen, an all-white initial-state image displayed when the liquid crystals are in the initial state is displayed. Therefore, it is found that, in the off state, the liquid crystals are in a stable initial state where electric field is not applied.

Figure 13B:
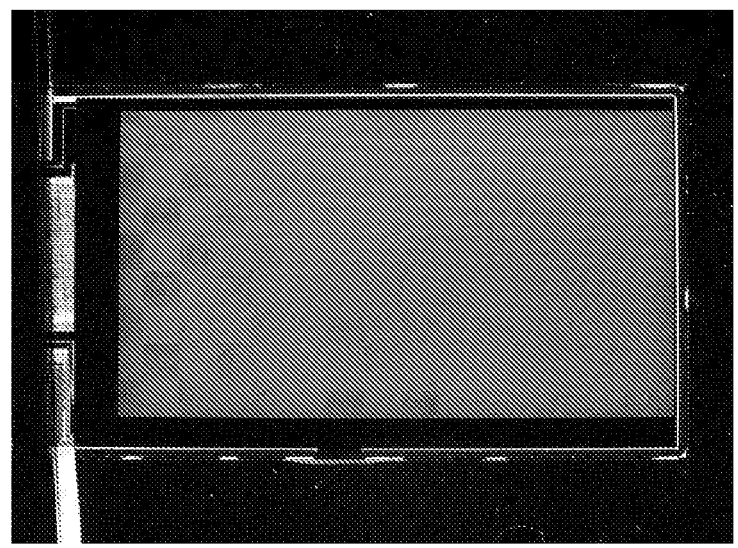

On the other hand, FIG. 13B illustrates a display screen just after the liquid crystal display device is turned off, in the case where the liquid crystal display device is turned off to stop the supply of the power source potential to the display panel while keeping the display image of the checked pattern illustrated in FIG. 13A left, as a comparative example. In FIG. 13B, it is found that the image of the checkered pattern displayed in the on state just before the liquid crystal display device is turned off can be faintly observed and electric field is continuously applied to the liquid crystals after the liquid crystal display device is turned off. Such applying of electric field for a period of time during which applying of electric field to the liquid crystals is not needed causes deterioration of the liquid crystals and the image display function and reliability of a liquid crystal display device may be deteriorated.

As apparent from the above, before the liquid crystal display device is in the off state, the fixed potential is written such that voltage is not applied to the liquid crystal element, and an initial-state image is displayed; therefore the liquid crystal element can be prevented from deteriorating, favorable image display function can be maintained for long period, and security can be improved.

Accordingly, a highly reliable liquid crystal display device in which low power consumption is achieved and a driving method of the liquid crystal display device can be provided.

This application is based on Japanese Patent Application serial No. 2010-009853 filed with Japan Patent Office on Jan. 20, 2010, the entire contents of which are hereby incorporated by reference.

The invention claimed is:

1. A driving method of a liquid crystal display device, comprising the steps of:
displaying an image on a screen provided with pixels each including a capacitor, a liquid crystal element, and a first transistor including a first oxide semiconductor layer by supplying a power source potential from a power source so that liquid crystals of the liquid crystal element respond;
supplying a stop signal by a stop unit;
displaying an initial-state image on the screen provided with the pixels by supplying a fixed potential to one electrode of the liquid crystal element through the first transistor, and to another electrode of the liquid crystal element through a second transistor including a second oxide semiconductor layer so that a state of the liquid crystals changes from a response state to a non-response state; and
stopping the supply of the power source potential from the power source after writing the fixed potential to the capacitors,
wherein each of the first oxide semiconductor layer and the second oxide semiconductor layer includes a channel region.

2. The driving method of a liquid crystal display device according to claim 1, further comprising the step of comparing image signals in successive frame periods with respect to each of the pixels.

3. The driving method of a liquid crystal display device according to claim 1,
wherein a second image signal is not written in a case where a first image signal corresponding to a first frame and the second image signal corresponding to a second frame are the same wherein the first frame and the second frame are successive frames.

4. The driving method of a liquid crystal display device according to claim 1,
wherein the power source potential is supplied to a driver circuit portion in the step of supplying the power source potential from the power source, and
wherein the supply of the power source potential to the driver circuit portion is stopped in the step of stopping the supply of the power source potential from the power source.

5. The driving method of a liquid crystal display device according to claim 1,
wherein the power source potential is supplied to a driver circuit portion and a backlight portion in the step of supplying the power source potential from the power source, and
wherein the supply of the power source potential to the driver circuit portion and the backlight portion is stopped in the step of stopping the supply of the power source potential from the power source.

6. A driving method of a liquid crystal display device, comprising the steps of:
displaying an image on a screen provided with pixels each including a capacitor, a liquid crystal element, and a first transistor including a first oxide semiconductor layer by supplying a power source potential from a power source so that liquid crystals of the liquid crystal element respond;
supplying a stop signal by a stop unit;
displaying an initial-state image on the screen provided with the pixels by supplying a fixed potential to one electrode of the liquid crystal element through the first transistor, and to another electrode of the liquid crystal element through a second transistor including a second oxide semiconductor layer so that a state of the liquid crystals changes from a response state to a non-response state; and
stopping the supply of the power source potential from the power source after writing the fixed potential to the capacitors,
wherein the initial-state image is one of an all white image and all black image, and
wherein each of the first oxide semiconductor layer and the second oxide semiconductor layer includes a channel region.

7. The driving method of a liquid crystal display device according to claim 6,
wherein the capacitor and the liquid crystal element are electrically connected in parallel.

8. The driving method of a liquid crystal display device according to claim 6, further comprising the step of comparing image signals in successive frame periods with respect to each of the pixels.

9. The driving method of a liquid crystal display device according to claim 6,
wherein a second image signal is not written in a case where a first image signal corresponding to a first frame and the second image signal corresponding to a second frame are the same wherein the first frame and the second frame are successive frames.

10. The driving method of a liquid crystal display device according to claim 6,
wherein the power source potential is supplied to a driver circuit portion in the step of supplying the power source potential from the power source, and wherein the supply of the power source potential to the driver circuit portion is stopped in the step of stopping the supply of the power source potential from the power source.

11. The driving method of a liquid crystal display device according to claim 6, wherein the power source potential is supplied to a driver circuit portion and a backlight portion in the step of supplying the power source potential from the power source, and wherein the supply of the power source potential to the driver circuit portion and the backlight portion is stopped in the step of stopping the supply of the power source potential from the power source.

12. A driving method of a liquid crystal display device, comprising the steps of:

displaying an image on a screen provided with pixels each including a capacitor, a liquid crystal element, and a first transistor including a first oxide semiconductor layer by supplying a power source potential from a power source so that liquid crystals of the liquid crystal element respond;

supplying a stop signal by a stop unit;

displaying an initial-state image on the screen provided with the pixels by supplying a fixed potential to one electrode of the liquid crystal element through the first transistor, and to another electrode of the liquid crystal element through a second transistor including a second oxide semiconductor layer so that a state of the liquid crystals changes from a response state to a non-response state; and stopping the supply of the power source potential from the power source after writing the fixed potential to the capacitors, wherein the liquid crystal element comprises a nematic liquid crystal, and wherein each of the first oxide semiconductor layer and the second oxide semiconductor layer includes a channel region.

13. The driving method of a liquid crystal display device according to claim 12, further comprising the step of comparing image signals in successive frame periods with respect to each of the pixels.

14. The driving method of a liquid crystal display device according to claim 12, wherein a second image signal is not written in a case where a first image signal corresponding to a first frame and the second image signal corresponding to a second frame are the same wherein the first frame and the second frame are successive frames.

15. The driving method of a liquid crystal display device according to claim 12, wherein the power source potential is supplied to a driver circuit portion in the step of supplying the power source potential from the power source, and wherein the supply of the power source potential to the driver circuit portion is stopped in the step of stopping the supply of the power source potential from the power source.

16. The driving method of a liquid crystal display device according to claim 12, wherein the power source potential is supplied to a driver circuit portion and a backlight portion in the step of supplying the power source potential from the power source, and wherein the supply of the power source potential to the driver circuit portion and the backlight portion is stopped in the step of stopping the supply of the power source potential from the power source.

17. A driving method of a liquid crystal display device, comprising the steps of:

displaying an image on a screen provided with pixels each including a capacitor, a liquid crystal element, and a first transistor including a first oxide semiconductor layer by supplying a power source potential from a power source to a driver circuit portion and a backlight portion so that liquid crystals of the liquid crystal element respond;

supplying a stop signal by a stop unit;

stopping the supply of the power source potential from the power source to the backlight portion;

displaying an initial-state image on the screen provided with the pixels by supplying a fixed potential to one electrode of the liquid crystal element through the first transistor, and to another electrode of the liquid crystal element through a second transistor including a second oxide semiconductor layer so that a state of the liquid crystals changes from a response state to a non-response state; and stopping the supply of the power source potential from the power source to the driver circuit portion after wiring the fixed potential to the capacitors, wherein each of the first oxide semiconductor layer and the second oxide semiconductor layer includes a channel region.

18. The driving method of a liquid crystal display device according to claim 17, further comprising the step of comparing image signals in successive frame periods with respect to each of the pixels.

19. The driving method of a liquid crystal display device according to claim 17, wherein a second image signal is not written in a case where a first image signal corresponding to a first frame and the second image signal corresponding to a second frame are the same wherein the first frame and the second frame are successive frames.

* * * * *